US007830858B2

(12) United States Patent
Binder

(10) Patent No.: US 7,830,858 B2
(45) Date of Patent: Nov. 9, 2010

(54) LOCAL AREA NETWORK OF SERIAL INTELLIGENT CELLS

(75) Inventor: Yehuda Binder, Hod Ha'sharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 1307 days.

(21) Appl. No.: 11/264,011

(22) Filed: Nov. 2, 2005

(65) Prior Publication Data

US 2006/0056444 A1 Mar. 16, 2006

Related U.S. Application Data

(63) Continuation of application No. 10/178,223, filed on Jun. 25, 2002, now Pat. No. 7,016,368, which is a continuation of application No. 09/123,486, filed on Jul. 28, 1998, now Pat. No. 6,480,510.

(51) Int. Cl.
*H04L 12/28* (2006.01)
(52) U.S. Cl. .......................... 370/351; 370/436; 370/502
(58) Field of Classification Search ................. 370/436, 370/502, 908, 479, 335, 295, 337, 342, 344, 370/343, 347, 441, 254, 285, 293, 463, 400–402, 370/351, 508
See application file for complete search history.

(56) References Cited

U.S. PATENT DOCUMENTS

| 404,721 | A | 6/1889 | Messer |
|---|---|---|---|
| 405,422 | A | 6/1889 | Law et al. |
| 2,680,162 | A | 6/1954 | Brehm et al. |
| 3,370,125 | A | 2/1968 | Shaw et al. |

(Continued)

FOREIGN PATENT DOCUMENTS

DE  33 29 336 A1  12/1983

(Continued)

OTHER PUBLICATIONS

IEEE Standard for a High Performance serial Bus; IEEE Std 1394-1995 Published 1996 (392 pages).

(Continued)

*Primary Examiner*—Chau T. Nguyen
*Assistant Examiner*—Alexander Boakye
(74) *Attorney, Agent, or Firm*—Browdy and Neimark, PLLC

(57) ABSTRACT

A serial intelligent cell (SIC) and a connection topology for local area networks using Electrically-conducting media. A local area network can be configured from a plurality of SIC's interconnected so that all communications between two adjacent SIC's is both point-to-point and bidirectional. Each SIC can be connected to one or more other SIC's to allow redundant communication paths. Communications in different areas of a SIC network are independent of one another, so that, unlike current bus topology and star topology, there is no fundamental limit on the size or extent of a SIC network. Each SIC can optionally be connected to one or more data terminals, computers, telephones, sensors, actuators, etc., to facilitate interconnectivity among such devices. Networks according to the present invention can be configured for a variety of applications, including a local telephone system, remote computer bus extender, multiplexers, PABX/PBX functionality, security systems, and local broadcasting services. The network can use dedicated wiring, as well as existing wiring as the in-house telephone or electrical wiring.

149 Claims, 9 Drawing Sheets

U.S. PATENT DOCUMENTS

| | | |
|---|---|---|
| 3,539,727 A | 11/1970 | Pasternack |
| 3,659,277 A | 4/1972 | Brown |
| 3,699,523 A | 10/1972 | Percher |
| 3,702,460 A | 11/1972 | Blose |
| 3,717,858 A | 2/1973 | Hadden |
| 3,806,814 A | 4/1974 | Forbes |
| 3,835,334 A | 9/1974 | Notteau |
| 3,836,888 A | 9/1974 | Boenke et al. |
| 3,870,822 A | 3/1975 | Matthews |
| 3,922,490 A | 11/1975 | Pettis |
| 3,924,077 A | 12/1975 | Blakeslee |
| 3,959,772 A | 5/1976 | Wakasa et al. |
| 3,968,333 A | 7/1976 | Simokat et al. |
| 3,975,594 A | 8/1976 | Guntersdorfer |
| 4,012,734 A | 3/1977 | Jagoda et al. |
| 4,173,714 A | 11/1979 | Bloch et al. |
| 4,197,431 A | 4/1980 | Vis |
| 4,232,200 A | 11/1980 | Hestad et al. |
| 4,241,243 A | 12/1980 | Ball |
| 4,272,759 A | 6/1981 | Handy |
| 4,303,993 A | 12/1981 | Panepinto, Jr. et al. |
| 4,339,750 A | 7/1982 | Delacruz |
| 4,339,816 A | 7/1982 | Reed |
| 4,367,557 A | 1/1983 | Stern et al. |
| 4,373,117 A | 2/1983 | Pierce |
| 4,389,694 A | 6/1983 | Cornwell, Jr. |
| 4,395,590 A | 7/1983 | Pierce et al. |
| 4,413,229 A | 11/1983 | Grant |
| 4,415,774 A | 11/1983 | Driver |
| 4,417,099 A | 11/1983 | Pierce |
| 4,431,869 A | 2/1984 | Sweet |
| 4,463,341 A | 7/1984 | Iwasaki |
| 4,467,314 A | 8/1984 | Weikel et al. |
| 4,477,896 A | 10/1984 | Aker |
| 4,484,185 A | 11/1984 | Graves |
| 4,490,683 A | 12/1984 | Rhee |
| 4,507,721 A | 3/1985 | Yamano et al. |
| 4,509,211 A | 4/1985 | Robbins |
| 4,510,493 A | 4/1985 | Bux et al. |
| 4,523,307 A | 6/1985 | Brown et al. |
| 4,534,039 A | 8/1985 | Dodds et al. |
| 4,535,401 A | 8/1985 | Penn |
| 4,543,450 A | 9/1985 | Brandt |
| 4,551,721 A | 11/1985 | Kozlik |
| 4,578,533 A | 3/1986 | Pierce |
| 4,583,214 A | 4/1986 | Miyashita et al. |
| 4,592,069 A | 5/1986 | Redding |
| 4,593,389 A | 6/1986 | Wurzburg et al. |
| 4,621,170 A | 11/1986 | Picandet |
| 4,633,217 A | 12/1986 | Akano |
| 4,639,714 A | 1/1987 | Crowe |
| 4,642,607 A | 2/1987 | Strom et al. |
| 4,669,916 A | 6/1987 | White et al. |
| 4,670,874 A | 6/1987 | Sato et al. |
| 4,672,605 A | 6/1987 | Hustig et al. |
| 4,677,646 A | 6/1987 | Dodds et al. |
| 4,691,344 A | 9/1987 | Brown et al. |
| 4,714,912 A | 12/1987 | Roberts et al. |
| 4,719,616 A | 1/1988 | Akano |
| 4,724,435 A | 2/1988 | Moses et al. |
| 4,733,380 A | 3/1988 | Havira |
| 4,733,389 A | 3/1988 | Puvogel |
| 4,734,919 A | 3/1988 | Tae |
| 4,736,367 A | 4/1988 | Wroblewski et al. |
| 4,742,538 A | 5/1988 | Szlam |
| 4,745,391 A | 5/1988 | Gajjar |
| 4,755,792 A | 7/1988 | Pezzolo et al. |
| 4,761,646 A | 8/1988 | Choquet et al. |
| 4,766,402 A | 8/1988 | Crane |
| 4,772,870 A | 9/1988 | Reyes |
| 4,780,714 A | 10/1988 | Moustakas et al. |
| 4,782,322 A | 11/1988 | Lechner et al. |
| 4,785,448 A | 11/1988 | Reichert et al. |
| 4,788,527 A | 11/1988 | Johansson |
| 4,799,211 A | 1/1989 | Felker et al. |
| 4,803,485 A | 2/1989 | Rypinski |
| 4,803,719 A | 2/1989 | Ulrich |
| 4,806,905 A | 2/1989 | McGowan, III et al. |
| 4,807,225 A | 2/1989 | Fitch |
| 4,809,296 A | 2/1989 | Braun et al. |
| 4,809,339 A | 2/1989 | Shih et al. |
| 4,814,941 A | 3/1989 | Speet et al. |
| 4,815,106 A | 3/1989 | Propp et al. |
| 4,821,319 A | 4/1989 | Middleton et al. |
| 4,825,349 A | 4/1989 | Marcel |
| 4,866,602 A | 9/1989 | Hall |
| 4,866,757 A | 9/1989 | Nilssen |
| 4,890,102 A | 12/1989 | Oliver |
| 4,896,349 A | 1/1990 | Kubo et al. |
| 4,899,131 A | 2/1990 | Wilk et al. |
| 4,901,218 A | 2/1990 | Cornwell |
| 4,918,690 A | 4/1990 | Markkula et al. |
| 4,924,492 A | 5/1990 | Gitlin et al. |
| 4,926,158 A | 5/1990 | Zeigler |
| 4,937,811 A | 6/1990 | Harris |
| 4,939,728 A | 7/1990 | Markkula, Jr. et al. |
| 4,953,055 A | 8/1990 | Douhet et al. |
| 4,955,018 A | 9/1990 | Twitty et al. |
| 4,969,147 A | 11/1990 | Markkula, Jr. et al. |
| 4,973,954 A | 11/1990 | Schwarz |
| 4,979,183 A | 12/1990 | Cowart |
| 4,991,221 A | 2/1991 | Rush |
| 4,992,774 A | 2/1991 | McCullough |
| 5,001,774 A | 3/1991 | Lee |
| 5,003,457 A | 3/1991 | Ikei et al. |
| 5,010,399 A | 4/1991 | Goodman et al. |
| 5,014,308 A | 5/1991 | Fox |
| 5,018,138 A | 5/1991 | Twitty et al. |
| 5,021,779 A | 6/1991 | Bisak |
| 5,025,443 A | 6/1991 | Gupta |
| 5,032,819 A | 7/1991 | Sakuragi et al. |
| 5,033,062 A | 7/1991 | Morrow et al. |
| 5,033,112 A | 7/1991 | Bowling et al. |
| 5,034,531 A | 7/1991 | Friary et al. |
| 5,034,882 A | 7/1991 | Eisenhard et al. |
| 5,034,883 A | 7/1991 | Donaldson et al. |
| 5,063,563 A | 11/1991 | Ikeda et al. |
| 5,065,133 A | 11/1991 | Howard |
| 5,068,890 A | 11/1991 | Nilssen |
| 5,089,927 A | 2/1992 | Bulan et al. |
| 5,089,974 A | 2/1992 | Demeyer et al. |
| 5,113,498 A | 5/1992 | Evan et al. |
| 5,121,482 A | 6/1992 | Patton |
| 5,125,077 A | 6/1992 | Hall |
| 5,144,544 A | 9/1992 | Jenneve et al. |
| 5,146,471 A | 9/1992 | Cowart |
| 5,148,144 A | 9/1992 | Sutterlin et al. |
| 5,150,365 A | 9/1992 | Hirata et al. |
| 5,157,711 A | 10/1992 | Shimanuki |
| 5,175,764 A | 12/1992 | Patel et al. |
| 5,181,240 A | 1/1993 | Sakuragi et al. |
| 5,192,231 A | 3/1993 | Dolin, Jr. |
| 5,210,518 A | 5/1993 | Graham et al. |
| 5,210,519 A | 5/1993 | Moore |
| 5,210,788 A | 5/1993 | Nilssen |
| 5,216,704 A | 6/1993 | Williams et al. |
| 5,220,597 A | 6/1993 | Horiuchi |
| 5,224,154 A | 6/1993 | Aldridge et al. |
| 5,241,283 A | 8/1993 | Sutterlin |
| 5,247,347 A | 9/1993 | Litteral et al. |
| 5,255,267 A | 10/1993 | Hansen et al. |
| 5,257,006 A | 10/1993 | Graham et al. |
| 5,268,676 A | 12/1993 | Asprey et al. |
| 5,274,631 A | 12/1993 | Bhardwaj |

| | | | | | |
|---|---|---|---|---|---|
| 5,285,477 A | 2/1994 | Leonowich | 5,651,696 A | 7/1997 | Jennison |
| 5,289,359 A | 2/1994 | Ziermann | 5,652,893 A | 7/1997 | Ben-Meir et al. |
| 5,289,476 A | 2/1994 | Johnson et al. | 5,659,608 A | 8/1997 | Stiefel |
| 5,311,114 A | 5/1994 | Sambamurthy et al. | 5,671,220 A | 9/1997 | Tonomura |
| 5,311,518 A | 5/1994 | Takato et al. | 5,675,813 A | 10/1997 | Teng et al. |
| 5,311,593 A | 5/1994 | Carmi | 5,680,397 A | 10/1997 | Christensen et al. |
| 5,319,571 A | 6/1994 | Langer et al. | 5,682,423 A | 10/1997 | Walker |
| 5,323,461 A | 6/1994 | Rosenbaum et al. | 5,684,826 A | 11/1997 | Ratner |
| 5,343,240 A | 8/1994 | Yu | 5,689,230 A | 11/1997 | Merwin et al. |
| 5,343,514 A | 8/1994 | Snyder | 5,696,790 A | 12/1997 | Graham |
| 5,347,549 A | 9/1994 | Baumann et al. | 5,706,007 A | 1/1998 | Fragnito et al. |
| 5,351,272 A | 9/1994 | Abraham | 5,706,157 A | 1/1998 | Galecki et al. |
| 5,353,409 A | 10/1994 | Asprey et al. | 5,708,701 A | 1/1998 | Houvig et al. |
| 5,355,114 A | 10/1994 | Sutterlin et al. | 5,712,614 A | 1/1998 | Patel et al. |
| 5,356,311 A | 10/1994 | Liu | 5,727,025 A | 3/1998 | Maryanka |
| 5,368,041 A | 11/1994 | Shambroom | 5,742,527 A | 4/1998 | Rybicki et al. |
| 5,375,051 A | 12/1994 | Decker et al. | 5,748,634 A | 5/1998 | Sokol et al. |
| 5,381,804 A | 1/1995 | Shambroom | 5,754,539 A | 5/1998 | Metz et al. |
| 5,391,932 A | 2/1995 | Small et al. | 5,774,789 A | 6/1998 | van der Kaay et al. |
| 5,396,636 A | 3/1995 | Gallagher et al. | 5,777,769 A | 7/1998 | Coutinho |
| 5,404,127 A | 4/1995 | Lee et al. | 5,778,303 A | 7/1998 | Shinozaki et al. |
| 5,406,260 A | 4/1995 | Cummings et al. | 5,781,844 A | 7/1998 | Spriester et al. |
| 5,410,535 A | 4/1995 | Yang et al. | 5,796,739 A | 8/1998 | Kim |
| 5,414,708 A | 5/1995 | Webber | 5,796,965 A | 8/1998 | Choi et al. |
| 5,420,578 A | 5/1995 | O'Brien et al. | 5,799,069 A | 8/1998 | Weston et al. |
| 5,420,886 A | 5/1995 | Ohmori | 5,799,196 A | 8/1998 | Flannery |
| 5,421,030 A | 5/1995 | Baran | 5,801,635 A | 9/1998 | Price |
| 5,422,519 A | 6/1995 | Russell | 5,802,173 A | 9/1998 | Hamilton-Percy et al. |
| 5,424,710 A | 6/1995 | Baumann | 5,805,053 A | 9/1998 | Patel et al. |
| 5,428,682 A | 6/1995 | Apfel | 5,805,591 A | 9/1998 | Naboulsi et al. |
| 5,438,678 A | 8/1995 | Smith | 5,805,597 A | 9/1998 | Edem |
| 5,440,335 A | 8/1995 | Beveridge | 5,805,806 A | 9/1998 | McArthur |
| 5,450,393 A | 9/1995 | Watanabe et al. | 5,815,681 A | 9/1998 | Kikinis |
| 5,451,923 A | 9/1995 | Seberger et al. | 5,818,710 A | 10/1998 | LeVan Suu |
| 5,454,008 A | 9/1995 | Baumann et al. | 5,818,821 A | 10/1998 | Schurig |
| 5,457,629 A | 10/1995 | Miller et al. | 5,822,677 A | 10/1998 | Peyrovian |
| 5,461,671 A | 10/1995 | Sakuragi et al. | 5,822,678 A | 10/1998 | Evanyk |
| 5,469,150 A | 11/1995 | Sitte | 5,828,293 A | 10/1998 | Rickard |
| 5,471,190 A * | 11/1995 | Zimmermann ......... 340/310.11 | 5,828,558 A | 10/1998 | Korcharz et al. |
| 5,475,687 A | 12/1995 | Markkula, Jr. et al. | 5,835,005 A | 11/1998 | Furukawa et al. |
| 5,477,091 A | 12/1995 | Fiorina et al. | 5,838,989 A | 11/1998 | Hutchison et al. |
| 5,483,230 A | 1/1996 | Mueller | 5,841,360 A | 11/1998 | Binder |
| 5,483,574 A | 1/1996 | Yuyama | 5,841,841 A | 11/1998 | Dodds et al. |
| 5,483,656 A | 1/1996 | Oprescu et al. | 5,842,032 A | 11/1998 | Bertsch |
| 5,491,402 A | 2/1996 | Small | 5,844,596 A | 12/1998 | Goodman |
| 5,491,463 A | 2/1996 | Sargeant et al. | 5,844,888 A | 12/1998 | Markkula et al. |
| 5,504,454 A | 4/1996 | Daggett et al. | 5,845,190 A | 12/1998 | Bushue et al. |
| 5,517,172 A | 5/1996 | Chiu | 5,848,054 A | 12/1998 | Mosebrook et al. |
| 5,525,962 A | 6/1996 | Tice | 5,848,376 A | 12/1998 | Steiner et al. |
| 5,528,089 A | 6/1996 | Guiset et al. | 5,859,584 A | 1/1999 | Counsell et al. |
| 5,530,748 A | 6/1996 | Ohmori | 5,859,596 A | 1/1999 | McRae |
| 5,535,336 A | 7/1996 | Smith et al. | 5,878,047 A | 3/1999 | Ganek et al. |
| 5,539,805 A | 7/1996 | Bushue et al. | 5,878,133 A | 3/1999 | Zhou et al. |
| 5,544,243 A | 8/1996 | Papadopoulos | 5,884,086 A | 3/1999 | Amoni et al. |
| 5,546,385 A | 8/1996 | Caspi et al. | 5,886,732 A | 3/1999 | Humpleman |
| 5,548,614 A | 8/1996 | Stoll et al. | 5,892,792 A | 4/1999 | Walley |
| 5,553,138 A | 9/1996 | Heald et al. | 5,892,795 A | 4/1999 | Paret |
| 5,563,515 A | 10/1996 | Kako | 5,896,443 A | 4/1999 | Dichter |
| 5,568,547 A | 10/1996 | Nishimura | 5,896,556 A | 4/1999 | Moreland et al. |
| 5,570,085 A | 10/1996 | Bertsch | 5,903,213 A | 5/1999 | Hodge et al. |
| 5,572,182 A | 11/1996 | De Pinho Filho et al. | 5,917,624 A | 6/1999 | Wagner |
| 5,574,748 A | 11/1996 | Vander Mey et al. | 5,929,896 A | 7/1999 | Goodman et al. |
| 5,579,221 A | 11/1996 | Mun | 5,930,340 A | 7/1999 | Bell |
| 5,579,486 A | 11/1996 | Oprescu et al. | 5,938,757 A | 8/1999 | Bertsch |
| 5,581,801 A | 12/1996 | Spriester et al. | 5,939,801 A | 8/1999 | Bouffard et al. |
| 5,583,934 A | 12/1996 | Zhou | 5,940,400 A | 8/1999 | Eastmond et al. |
| 5,608,792 A | 3/1997 | Laidler | 5,944,831 A | 8/1999 | Pate et al. |
| 5,610,552 A | 3/1997 | Schlesinger et al. | 5,949,473 A | 9/1999 | Goodman |
| 5,610,922 A | 3/1997 | Balatoni | 5,960,066 A | 9/1999 | Hartmann et al. |
| 5,613,130 A | 3/1997 | Teng et al. | 5,960,208 A | 9/1999 | Obata et al. |
| 5,625,863 A | 4/1997 | Abraham | 5,963,539 A | 10/1999 | Harold, Jr. |
| 5,635,896 A | 6/1997 | Tinsley et al. | 5,963,595 A | 10/1999 | Graham |
| 5,644,286 A | 7/1997 | Brosh et al. | 5,963,844 A | 10/1999 | Dail |

| | | | | | | |
|---|---|---|---|---|---|---|
| 5,973,942 | A | 10/1999 | Nelson et al. | 6,292,517 B1 | 9/2001 | Jeffress et al. |
| 5,974,553 | A | 10/1999 | Gandar | 6,295,356 B1 | 9/2001 | De Nicolo |
| 5,982,052 | A | 11/1999 | Sosnowski | 6,301,527 B1 | 10/2001 | Butland et al. |
| 5,990,577 | A | 11/1999 | Kamioka et al. | 6,308,215 B1 | 10/2001 | Kolbet et al. |
| 5,991,885 | A | 11/1999 | Chang et al. | 6,308,240 B1 | 10/2001 | De Nicolo |
| 5,994,998 | A | 11/1999 | Fisher et al. | 6,310,286 B1 | 10/2001 | Troxel et al. |
| 6,009,465 | A | 12/1999 | Decker et al. | 6,310,781 B1 | 10/2001 | Karam |
| 6,009,479 | A * | 12/1999 | Jeffries ............................ 710/8 | 6,317,839 B1 | 11/2001 | Wells |
| 6,011,794 | A | 1/2000 | Mordowitz et al. | 6,320,494 B1 | 11/2001 | Bartels et al. |
| 6,016,519 | A | 1/2000 | Chida et al. | 6,320,866 B2 | 11/2001 | Wolf et al. |
| 6,025,945 | A | 2/2000 | Nyu et al. | 6,320,900 B1 | 11/2001 | Liu |
| 6,026,078 | A | 2/2000 | Smith | 6,348,874 B1 | 2/2002 | Cole et al. |
| 6,033,101 | A | 3/2000 | Reddick et al. | 6,349,133 B1 | 2/2002 | Matthews et al. |
| 6,038,425 | A | 3/2000 | Jeffrey | 6,357,011 B2 | 3/2002 | Gilbert |
| 6,038,457 | A | 3/2000 | Barkat | 6,362,610 B1 | 3/2002 | Yang |
| 6,049,471 | A | 4/2000 | Korcharz et al. | 6,363,066 B1 | 3/2002 | Frimodig |
| 6,049,881 | A | 4/2000 | Massman et al. | 6,364,535 B1 | 4/2002 | Coffey |
| 6,055,633 | A | 4/2000 | Schrier et al. | 6,366,143 B1 | 4/2002 | Liu et al. |
| 6,069,588 | A | 5/2000 | O'Neill | 6,377,874 B1 | 4/2002 | Ykema |
| 6,069,899 | A | 5/2000 | Foley | 6,385,024 B1 | 5/2002 | Olson |
| 6,081,519 | A | 6/2000 | Petler | 6,389,139 B1 | 5/2002 | Curtis et al. |
| 6,081,533 | A | 6/2000 | Laubach et al. | 6,393,050 B1 | 5/2002 | Liu |
| 6,087,835 | A | 7/2000 | Haneda | 6,393,607 B1 | 5/2002 | Hughes et al. |
| 6,087,860 | A | 7/2000 | Liu | 6,396,391 B1 | 5/2002 | Binder |
| 6,095,867 | A | 8/2000 | Brandt et al. | 6,414,952 B2 | 7/2002 | Foley |
| 6,097,761 | A | 8/2000 | Buhring et al. | 6,430,199 B1 | 8/2002 | Kerpez |
| 6,107,912 | A | 8/2000 | Bullock et al. | 6,433,672 B1 | 8/2002 | Shirmard |
| 6,108,330 | A | 8/2000 | Bhatia et al. | 6,448,899 B1 | 9/2002 | Thompson |
| 6,109,959 | A | 8/2000 | Burlinson et al. | 6,449,318 B1 | 9/2002 | Rumbaugh |
| 6,111,764 | A | 8/2000 | Atou et al. | 6,449,348 B1 | 9/2002 | Lamb et al. |
| 6,114,632 | A | 9/2000 | Planas, Sr. et al. | 6,459,175 B1 | 10/2002 | Potega |
| 6,115,468 | A | 9/2000 | De Nicolo | 6,459,275 B1 | 10/2002 | Ewalt et al. |
| 6,115,755 | A | 9/2000 | Baldev | 6,470,053 B1 | 10/2002 | Liu |
| 6,115,822 | A | 9/2000 | Kim et al. | 6,470,401 B1 | 10/2002 | Peterson |
| 6,123,577 | A | 9/2000 | Contois et al. | 6,473,608 B1 | 10/2002 | Lehr et al. |
| 6,125,448 | A | 9/2000 | Schwan et al. | 6,477,457 B1 | 11/2002 | Fendt et al. |
| 6,126,463 | A | 10/2000 | Okazaki et al. | 6,480,122 B1 | 11/2002 | Oddy et al. |
| 6,128,743 | A | 10/2000 | Rothenbaum | 6,480,510 B1 | 11/2002 | Binder |
| 6,130,896 | A | 10/2000 | Lueker et al. | 6,481,013 B1 | 11/2002 | Dinwiddie et al. |
| 6,137,865 | A | 10/2000 | Ripy | 6,483,902 B1 | 11/2002 | Stewart |
| 6,141,763 | A | 10/2000 | Smith et al. | 6,496,103 B1 | 12/2002 | Weiss et al. |
| 6,144,292 | A | 11/2000 | Brown | 6,501,389 B1 | 12/2002 | Aguirre |
| 6,151,480 | A | 11/2000 | Fischer et al. | 6,510,204 B2 | 1/2003 | De Clercq et al. |
| 6,157,645 | A | 12/2000 | Shobatake | 6,518,724 B2 | 2/2003 | Janik |
| 6,157,716 | A | 12/2000 | Ortel | 6,522,515 B1 | 2/2003 | Whitney |
| 6,166,496 | A | 12/2000 | Lys et al. | 6,522,662 B1 | 2/2003 | Liu |
| 6,167,120 | A | 12/2000 | Kikinis | 6,526,516 B1 | 2/2003 | Ishikawa et al. |
| 6,175,556 | B1 | 1/2001 | Allen, Jr. et al. | 6,529,443 B2 | 3/2003 | Downey, Jr. et al. |
| 6,175,860 | B1 | 1/2001 | Gaucher | 6,535,587 B1 | 3/2003 | Kobayashi |
| 6,178,514 | B1 | 1/2001 | Wood | 6,535,983 B1 | 3/2003 | McCormick et al. |
| 6,181,783 | B1 | 1/2001 | Goodman | 6,539,011 B1 | 3/2003 | Keenan |
| 6,185,284 | B1 | 2/2001 | Goodman | 6,539,484 B1 | 3/2003 | Cruz |
| 6,188,314 | B1 | 2/2001 | Wallace et al. | 6,541,878 B1 | 4/2003 | Diab |
| 6,188,557 | B1 | 2/2001 | Chaundhry | 6,542,585 B2 | 4/2003 | Goodman |
| 6,192,399 | B1 | 2/2001 | Goodman | 6,546,494 B1 | 4/2003 | Jackson et al. |
| 6,212,274 | B1 | 4/2001 | Ninh | 6,553,076 B1 | 4/2003 | Huang |
| 6,215,789 | B1 | 4/2001 | Keenan | 6,556,097 B2 | 4/2003 | Coffey |
| 6,216,160 | B1 | 4/2001 | Dichter | 6,556,564 B2 | 4/2003 | Rogers |
| 6,218,930 | B1 | 4/2001 | Katzenberg et al. | 6,556,581 B1 | 4/2003 | He |
| 6,219,409 | B1 | 4/2001 | Smith et al. | 6,560,333 B1 | 5/2003 | Consiglio et al. |
| 6,227,499 | B1 | 5/2001 | Jennison et al. | 6,563,418 B1 | 5/2003 | Moon |
| 6,236,664 | B1 | 5/2001 | Erreygers | 6,563,816 B1 | 5/2003 | Nodoushani |
| 6,236,718 | B1 | 5/2001 | Goodman | 6,567,981 B1 | 5/2003 | Jeffrey |
| 6,240,166 | B1 | 5/2001 | Collin | 6,570,890 B1 | 5/2003 | Keenan |
| 6,243,413 | B1 | 6/2001 | Beukema | 6,571,181 B1 | 5/2003 | Rakshani et al. |
| 6,243,446 | B1 | 6/2001 | Goodman | 6,571,305 B1 | 5/2003 | Engler |
| 6,243,818 | B1 | 6/2001 | Schwan et al. | 6,574,242 B1 | 6/2003 | Keenan |
| 6,246,748 | B1 | 6/2001 | Yano | 6,574,313 B1 | 6/2003 | Chea, Jr. et al. |
| 6,252,754 | B1 | 6/2001 | Chaundhry | 6,574,741 B1 | 6/2003 | Fujimori et al. |
| 6,252,957 | B1 | 6/2001 | Jauregui et al. | 6,577,230 B1 | 6/2003 | Wendt et al. |
| 6,256,518 | B1 | 7/2001 | Buhrmann | 6,577,631 B1 | 6/2003 | Keenan |
| 6,282,075 | B1 | 8/2001 | Chaundhry | 6,577,882 B1 | 6/2003 | Roos |
| 6,283,789 | B1 | 9/2001 | Tsai | 6,580,254 B2 | 6/2003 | Schofield |

| | | |
|---|---|---|
| 6,580,710 B1 | 6/2003 | Bowen et al. |
| 6,584,197 B1 | 6/2003 | Boudreaux, Jr. et al. |
| 6,584,519 B1 | 6/2003 | Russell |
| 6,587,454 B1 | 7/2003 | Lamb |
| 6,587,479 B1 | 7/2003 | Bianchi et al. |
| 6,587,560 B1 | 7/2003 | Scott et al. |
| 6,601,097 B1 | 7/2003 | Cheston et al. |
| 6,603,220 B2 | 8/2003 | Vergnaud |
| 6,608,264 B1 | 8/2003 | Fouladpour |
| 6,611,537 B1 | 8/2003 | Edens et al. |
| 6,616,005 B1 | 9/2003 | Pereira et al. |
| 6,640,308 B1 | 10/2003 | Keyghobad et al. |
| 6,643,566 B1 | 11/2003 | Lehr et al. |
| 6,648,308 B2 | 11/2003 | Rothoff |
| 6,650,622 B1 | 11/2003 | Austerman, III et al. |
| 6,650,662 B1 | 11/2003 | Arnaud et al. |
| 6,653,932 B1 | 11/2003 | Beamish et al. |
| 6,658,098 B2 | 12/2003 | Lamb et al. |
| 6,658,108 B1 | 12/2003 | Bissell et al. |
| 6,658,109 B1 | 12/2003 | Steinke et al. |
| 6,659,947 B1 | 12/2003 | Carter et al. |
| 6,661,892 B1 | 12/2003 | Fischer |
| 6,665,404 B2 | 12/2003 | Cohen |
| 6,671,360 B2 | 12/2003 | Sumiya et al. |
| 6,678,321 B1 | 1/2004 | Graham et al. |
| 6,681,013 B1 | 1/2004 | Myamoto |
| 6,690,792 B1 | 2/2004 | Robinson et al. |
| 6,701,443 B1 | 3/2004 | Bell |
| 6,704,824 B1 | 3/2004 | Goodman |
| 6,710,704 B2 | 3/2004 | Fisher et al. |
| 6,715,087 B1 | 3/2004 | Vergnaud et al. |
| 6,721,790 B1 | 4/2004 | Chen |
| 6,732,315 B2 | 5/2004 | Yagel et al. |
| 6,735,217 B1 | 5/2004 | Weber, Jr. et al. |
| 6,738,641 B1 | 5/2004 | Elsasser |
| 6,747,859 B2 | 6/2004 | Walbeck et al. |
| 6,748,078 B1 | 6/2004 | Posthuma |
| 6,755,575 B2 | 6/2004 | Kronlund et al. |
| 6,762,675 B1 | 7/2004 | Cafiero et al. |
| 6,763,097 B1 | 7/2004 | Vitenberg |
| 6,763,109 B1 | 7/2004 | Hoskins |
| 6,764,343 B2 | 7/2004 | Ferentz |
| 6,771,774 B1 | 8/2004 | Phan et al. |
| 6,775,299 B1 | 8/2004 | Olson et al. |
| 6,778,549 B1 | 8/2004 | Keller |
| 6,778,646 B1 | 8/2004 | Sun |
| 6,795,539 B2 | 9/2004 | Culli et al. |
| 6,800,957 B2 | 10/2004 | Nerone et al. |
| 6,804,351 B1 | 10/2004 | Karam |
| 6,804,828 B1 | 10/2004 | Shibata |
| 6,815,844 B2 | 11/2004 | Kovarik |
| 6,819,760 B1 | 11/2004 | Nayler |
| 6,825,672 B1 | 11/2004 | Lo et al. |
| 6,831,921 B2 | 12/2004 | Higgins |
| 6,831,976 B1 | 12/2004 | Comerford et al. |
| 6,841,979 B2 | 1/2005 | Berson et al. |
| 6,847,718 B1 | 1/2005 | Hiraoka |
| 6,854,895 B2 | 2/2005 | Coffey et al. |
| 6,856,799 B1 | 2/2005 | Ritter |
| 6,862,353 B2 | 3/2005 | Rabenko et al. |
| 6,864,798 B2 | 3/2005 | Janik |
| 6,868,072 B1 | 3/2005 | Lin et al. |
| 6,868,265 B2 | 3/2005 | Zodnik |
| 6,870,282 B1 | 3/2005 | Bischoff et al. |
| 6,880,020 B1 | 4/2005 | Rubinstein et al. |
| 6,889,095 B1 | 5/2005 | Eidson et al. |
| 6,906,618 B2 | 6/2005 | Hair, III et al. |
| 6,912,145 B2 | 6/2005 | Hung et al. |
| 6,912,282 B2 | 6/2005 | Karam |
| 6,917,681 B2 | 7/2005 | Robinson et al. |
| 6,943,683 B2 | 9/2005 | Perret |
| 6,947,287 B1 | 9/2005 | Zansky et al. |
| 6,952,785 B1 | 10/2005 | Diab et al. |
| 6,954,863 B2 | 10/2005 | Mouton |
| 6,956,462 B2 | 10/2005 | Jetzt |
| 6,956,463 B2 | 10/2005 | Crenella et al. |
| 6,961,303 B1 | 11/2005 | Binder |
| 6,963,936 B2 | 11/2005 | Billington et al. |
| 6,973,394 B2 | 12/2005 | Jaeger et al. |
| 6,975,209 B2 | 12/2005 | Gromov |
| 6,977,507 B1 | 12/2005 | Pannell et al. |
| 6,985,713 B2 | 1/2006 | Lehr et al. |
| 6,986,071 B2 | 1/2006 | Darshan et al. |
| 6,995,658 B2 | 2/2006 | Tustison et al. |
| 6,996,458 B2 | 2/2006 | Pincu et al. |
| 6,996,729 B2 | 2/2006 | Volkening et al. |
| 6,998,964 B2 | 2/2006 | Lomax, Jr. et al. |
| 7,003,102 B2 | 2/2006 | Kiko |
| 7,010,050 B2 | 3/2006 | Maryanka |
| 7,016,377 B1 | 3/2006 | Chun et al. |
| 7,023,809 B1 | 4/2006 | Rubinstein et al. |
| 7,026,730 B1 | 4/2006 | Marshall et al. |
| 7,030,733 B2 | 4/2006 | Abbarin |
| 7,046,983 B2 | 5/2006 | Elkayam et al. |
| 7,049,514 B2 | 5/2006 | Brandt et al. |
| 7,053,501 B1 | 5/2006 | Barrass |
| 7,061,142 B1 | 6/2006 | Marshall |
| 7,068,781 B2 | 6/2006 | Le Creff et al. |
| 7,072,995 B1 | 7/2006 | Burroughs |
| 7,079,647 B2 | 7/2006 | Tomobe |
| 7,081,827 B2 | 7/2006 | Addy |
| 7,089,126 B2 | 8/2006 | Muir |
| 7,095,848 B1 | 8/2006 | Fischer et al. |
| 7,099,707 B2 | 8/2006 | Amin et al. |
| 7,113,574 B1 | 9/2006 | Haas et al. |
| 7,117,272 B2 | 10/2006 | Rimboim et al. |
| 7,143,299 B1 | 11/2006 | Rubinstein et al. |
| 7,145,439 B2 | 12/2006 | Darshan et al. |
| 7,152,168 B2 | 12/2006 | Boynton et al. |
| 7,154,381 B2 | 12/2006 | Lang et al. |
| 7,155,214 B2 | 12/2006 | Wood |
| 7,155,622 B2 | 12/2006 | Mancey et al. |
| 7,162,234 B1 | 1/2007 | Smith |
| 7,162,377 B2 | 1/2007 | Amrod et al. |
| 7,162,650 B2 | 1/2007 | Ke et al. |
| 7,170,194 B2 | 1/2007 | Korcharz et al. |
| 7,170,405 B2 | 1/2007 | Daum et al. |
| 7,181,023 B1 | 2/2007 | Andrews et al. |
| 7,193,149 B2 | 3/2007 | Polanek et al. |
| 7,194,639 B2 | 3/2007 | Atkinson et al. |
| 7,203,849 B2 | 4/2007 | Dove |
| 7,203,851 B1 | 4/2007 | Lo et al. |
| 7,207,846 B2 | 4/2007 | Caveney et al. |
| 7,221,261 B2 | 5/2007 | Klingensmith et al. |
| 7,225,345 B2 | 5/2007 | Korcharz et al. |
| 7,231,535 B2 | 6/2007 | Le Creff et al. |
| 7,240,224 B1 | 7/2007 | Biederman |
| 7,254,734 B2 | 8/2007 | Lehr et al. |
| 7,256,684 B1 | 8/2007 | Cafiero et al. |
| 7,257,108 B2 | 8/2007 | Cheston et al. |
| 7,272,669 B2 | 9/2007 | Mattur et al. |
| 7,280,032 B2 | 10/2007 | Aekins et al. |
| 7,281,141 B2 | 10/2007 | Elkayam et al. |
| 7,299,287 B1 | 11/2007 | Rubinstein et al. |
| 7,299,368 B2 | 11/2007 | Peker et al. |
| 7,310,355 B1 | 12/2007 | Krein et al. |
| 7,316,586 B2 | 1/2008 | Anderson et al. |
| 7,324,824 B2 | 1/2008 | Smith et al. |
| 7,330,695 B2 | 2/2008 | Karschnia et al. |
| 7,331,819 B2 | 2/2008 | Nelson et al. |
| 7,343,506 B1 | 3/2008 | Fenwick |
| 7,353,407 B2 | 4/2008 | Diab et al. |
| 7,356,588 B2 | 4/2008 | Stineman, Jr. et al. |
| 7,363,525 B2 | 4/2008 | Biederman et al. |
| 7,368,798 B2 | 5/2008 | Camagna et al. |
| 7,373,528 B2 | 5/2008 | Schindler |

| | | |
|---|---|---|
| 7,376,734 B2 | 5/2008 | Caveney |
| 7,380,044 B1 | 5/2008 | Liburdi |
| 7,404,091 B1 | 7/2008 | Gere |
| 7,404,094 B2 | 7/2008 | Lee et al. |
| 7,406,614 B2 | 7/2008 | Peleg et al. |
| 2001/0038635 A1 | 11/2001 | Rogers |
| 2001/0039660 A1 | 11/2001 | Vasilevsky et al. |
| 2002/0015489 A1 | 2/2002 | Ben-David |
| 2002/0021465 A1 | 2/2002 | Moore et al. |
| 2002/0031114 A1 | 3/2002 | Terry et al. |
| 2002/0039388 A1 | 4/2002 | Smart et al. |
| 2002/0057581 A1 | 5/2002 | Nadav |
| 2002/0059634 A1 | 5/2002 | Terry et al. |
| 2002/0063584 A1 | 5/2002 | Molenda et al. |
| 2002/0064039 A1 | 5/2002 | Clodfelter |
| 2002/0069417 A1 | 6/2002 | Kliger et al. |
| 2002/0076038 A1 | 6/2002 | Barrese et al. |
| 2002/0097821 A1 | 7/2002 | Hebron et al. |
| 2002/0104009 A1 | 8/2002 | Zodnik |
| 2002/0110236 A1 | 8/2002 | Karnad |
| 2002/0116720 A1 | 8/2002 | Terry et al. |
| 2002/0144159 A1 | 10/2002 | Wu et al. |
| 2002/0150155 A1 | 10/2002 | Florentin et al. |
| 2002/0159402 A1 | 10/2002 | Binder |
| 2002/0166124 A1 | 11/2002 | Gurantz et al. |
| 2002/0166125 A1 | 11/2002 | Fulmer |
| 2002/0174423 A1 | 11/2002 | Fifield et al. |
| 2002/0180592 A1 | 12/2002 | Gromov |
| 2002/0188762 A1 | 12/2002 | Tomassetti et al. |
| 2002/0194383 A1 | 12/2002 | Cohen et al. |
| 2002/0194605 A1 | 12/2002 | Cohen et al. |
| 2003/0035556 A1 | 2/2003 | Curtis et al. |
| 2003/0061522 A1 | 3/2003 | Ke et al. |
| 2003/0062990 A1 | 4/2003 | Schaeffer et al. |
| 2003/0066082 A1 | 4/2003 | Kliger et al. |
| 2003/0099228 A1 | 5/2003 | Alcock |
| 2003/0107269 A1 | 6/2003 | Jetzt |
| 2003/0112965 A1 | 6/2003 | McNamara et al. |
| 2003/0133476 A1 | 7/2003 | Stone et al. |
| 2003/0146765 A1 | 8/2003 | Darshan et al. |
| 2003/0151695 A1 | 8/2003 | Sahlin et al. |
| 2003/0154273 A1 | 8/2003 | Caveney |
| 2003/0154276 A1 | 8/2003 | Caveney |
| 2003/0206623 A1 | 11/2003 | Deichstetter et al. |
| 2003/0207696 A1 | 11/2003 | Shpak |
| 2004/0013098 A1 | 1/2004 | Tseng et al. |
| 2004/0073597 A1 | 4/2004 | Caveney |
| 2004/0090984 A1 | 5/2004 | Saint-Hilaire et al. |
| 2004/0107445 A1 | 6/2004 | Amit |
| 2004/0121648 A1 | 6/2004 | Voros |
| 2004/0136373 A1 | 7/2004 | Bareis |
| 2004/0136384 A1 | 7/2004 | Cho |
| 2004/0136388 A1 | 7/2004 | Schaff |
| 2004/0146061 A1 | 7/2004 | Bisceglia et al. |
| 2004/0147232 A1 | 7/2004 | Zodnik |
| 2004/0164619 A1 | 8/2004 | Parker et al. |
| 2004/0180573 A1 | 9/2004 | Chen |
| 2004/0198236 A1 | 10/2004 | Paine et al. |
| 2004/0230846 A1 | 11/2004 | Mancey et al. |
| 2004/0232768 A1 | 11/2004 | Hung et al. |
| 2004/0236967 A1 | 11/2004 | Korcharz et al. |
| 2004/0268160 A1 | 12/2004 | Atkinson et al. |
| 2005/0047379 A1 | 3/2005 | Boyden et al. |
| 2005/0053087 A1 | 3/2005 | Pulyk |
| 2005/0063108 A1 | 3/2005 | Voll et al. |
| 2005/0073968 A1 | 4/2005 | Perlman |
| 2005/0076148 A1 | 4/2005 | Chan |
| 2005/0078700 A1 | 4/2005 | Thompson et al. |
| 2005/0086389 A1 | 4/2005 | Chang |
| 2005/0097369 A1 | 5/2005 | Bowser et al. |
| 2005/0125083 A1 | 6/2005 | Kiko |
| 2005/0125507 A1 | 6/2005 | Atias et al. |
| 2005/0136972 A1 | 6/2005 | Smith et al. |
| 2005/0136989 A1 | 6/2005 | Dove |
| 2005/0152306 A1 | 7/2005 | Bonnassieux et al. |
| 2005/0152323 A1 | 7/2005 | Bonnassieux et al. |
| 2005/0152337 A1 | 7/2005 | Wurtzel et al. |
| 2005/0177640 A1 | 8/2005 | Rubinstein |
| 2005/0201306 A1 | 9/2005 | Engel |
| 2005/0245127 A1 | 11/2005 | Nordin et al. |
| 2005/0268120 A1 | 12/2005 | Schindler et al. |
| 2005/0281326 A1 | 12/2005 | Yu |
| 2006/0053324 A1 | 3/2006 | Giat et al. |
| 2006/0089230 A1 | 4/2006 | Biederman et al. |
| 2006/0165097 A1 | 7/2006 | Caveney |
| 2006/0168459 A1 | 7/2006 | Dwelley et al. |
| 2006/0181398 A1 | 8/2006 | Martich et al. |
| 2006/0197387 A1 | 9/2006 | Hung et al. |
| 2006/0215680 A1 | 9/2006 | Camagna |
| 2006/0238250 A1 | 10/2006 | Camagna et al. |
| 2006/0251179 A1 | 11/2006 | Ghoshal |
| 2006/0262727 A1 | 11/2006 | Caveney |
| 2006/0269001 A1 | 11/2006 | Dawson et al. |
| 2007/0041577 A1 | 2/2007 | Ghoshal et al. |
| 2007/0058666 A1 | 3/2007 | Pratt |
| 2007/0083668 A1 | 4/2007 | Kelsey et al. |
| 2007/0198748 A1 | 8/2007 | Ametsitsi et al. |
| 2007/0206749 A1 | 9/2007 | Pincu et al. |
| 2007/0208961 A1 | 9/2007 | Ghoshal et al. |
| 2007/0220618 A1 | 9/2007 | Holmes et al. |
| 2007/0236853 A1 | 10/2007 | Crawley |
| 2007/0254714 A1 | 11/2007 | Martich et al. |
| 2007/0260904 A1 | 11/2007 | Camagna et al. |
| 2008/0058018 A1 | 3/2008 | Scheinert |
| 2008/0140565 A1 | 6/2008 | DeBenedetti et al. |

FOREIGN PATENT DOCUMENTS

| | | |
|---|---|---|
| EP | 0241152 A | 10/1987 |
| EP | 0355532 | 2/1990 |
| EP | 1343253 A1 | 9/2003 |
| GB | 2368979 A | 5/2002 |
| JP | 56-087192 A | 7/1981 |
| JP | 57204655 A | 12/1982 |
| JP | 58206257 A | 12/1983 |
| JP | 07-336379 A | 12/1995 |
| JP | 09-084146 A | 3/1997 |
| WO | 9623377 A1 | 8/1996 |
| WO | WO 96/23377 | 8/1996 |
| WO | WO 96/23377 A1 | 8/1996 |
| WO | WO 97/50193 A | 12/1997 |
| WO | WO 98/02985 A | 1/1998 |
| WO | WO 99/53627 | 10/1999 |
| WO | WO 99/53627 A1 | 10/1999 |
| WO | WO 01/43238 A1 | 6/2001 |
| WO | WO 02/091652 A2 | 11/2002 |
| WO | WO 02/102019 A2 | 12/2002 |

OTHER PUBLICATIONS

DSLPipe Reference Guide; by Ascend Communications, Jun. 2, 1997 (162 pages).
DSLPipe User's Guide; by Ascend Communications, Jun. 3, 1997 (245 pages).
Ascend DSLPipe-S Features and specifications; Posted May 12, 1997 (4 pages).
CiscoPro EtherSwitch CPW2115; Dec. 1995 (4 pages).
IBM LAN Bridge and Switch Summary -undated (108 pages).
Hart Field Communication Protocol—An introduction for users and manufacturers' published by the HART Communication Foundation, Austin, Texas, Oct. 1995 (12 pages).
Continuation of IBM LAN Bridge and Switch Summary -undated (68 pages).
Motorola announces key new features to CyberSURFR Cable Modem System- undated (3 pages).
SuperStack II Desktop Switch; 3Com Sep. 1996 (2 pages).

3Com Impact IQ External ISDN Modem User product brochure; Published Jun. 1996 (4 pages).
3ComImpact IQ External ISDN Modem User Guide; Published Jul. 1997 (157 pages).
Cisco Catalyst 5000 Series Configuration Worksheet, 1996 (11 pages).
Cisco Catalyst 5000 Product Announcement, Published 1996 (22 pages).
Cisco Catalyst 5000 ATM Dual PHY LAN Emulation Module; Posted Sep. 24, 1996 (4 pages).
Cisco Catalyst 5000 Group Switching Ethernet Modules; Posted May 6, 1996 (5 pages).
The Mac Reborn; Macworld Sep. 1996, p. 104-115 (16 pages).
The Mac reborn; Macworld vol. 13, Issue 9, Sep. 1996 (9 pages).
Universal Serial Bus Specification—Rev. 1.0, Jan. 15, 1996; Sec. 4.2.1 pp. 29-30. cited by other.
Universal Serial Bus Specification—Rev. 1.0, Jan. 15, 1996; Sec. 7.2.1-7.2.1.5 pp. 131-135. cited by other .
Universal Serial Bus Specification—Rev. 1.0, Jan. 15, 1996; Sec. 9.2.1-9.2.5.1 pp. 170-171. cited by other .
Universal Serial Bus Specification—Rev. 1.0, Jan. 15, 1996; Sec. 9.6.2 pp. 184-185. cited by other.
Bearfield, J.M., "Control the Power Interface of USB's Voltage Bus", Electronic Design, U.S., Penton Publishing, Clev. Ohio, vol. 45, No. 15, Jul. 1997, p. 80-86. cited by other .
RAD Data Comm. Ltd., "Token Ring Design Guide", 1994, #TR-20-01/94, Chapters 1 through 4-21. cited by other .
PowerDsine Product Catalogue 1999, pp. 56-79 and 95-105, Israel. cited by other .
ITU-T 1.430 Integrated Services Digital Network—Basic User-Network Interface—Layer 1 Specification. cited by other.
Cisco Catalyst 5000; Industry's First Modular, Multilayer-Capable switching System for the Wiring Closet; Posted May 16, 1996 (22 pages).
Catalyst 5000 switching System; Cisco (4 pages).
Cisco Catalyst 5002 Switching System; (4 pages).
Canned Heat; Data Communications Feb. 1996 (10 pages).
Catalyst 5000 Series; (12 pages).
Fast Ethernet 100-Mbps Solutions; Posted Mar. 12, 1996 (10 pages).
Forget the Forklift; Data Communications Sep. 1996 (11 pages).
LAN Emulation; Posted Nov. 15, 1995 (16 pages).
IBM LAN Bridge and Switch Summary, IBM, published Jan. 1996 (70 pages).
Continuation of IBM LAN Bridge and Switch Summary, IBM, published Jan. 1996 (70 pages).
Edward Cooper, Broadband Network Technology-An overview for the data and communications industries, Sytek Systems, Mountain View, CA, 1984 (4 pages).
Grayson Evans, The Cebus Standard User'S Guide May 1996 (317 pages).
Technical Report TR-001 ADSL Forum System Reference Model May 1996 (6 pages).
Cisco Catalyst 5000 Group Switching Ethernet Modules Data Sheets; 1996 (2 pages).
Cisco Catalyst 5000 Switching System Data Sheets; 1996 (2 pages).
Cisco Catalyst 5000 ATM LAN Emulation Module Data Sheets; 1995 (2 pages).
Cisco Catalyst 5000 Family Fast EtherChannel Switching Modules Data Sheets; 1999 (3 pages).
Motorola CableComm CyberSURFR Cable Modem Specifications; Apr. 1998 (4 pages).
3Com Product details 3COM NBX 2101PE Basic Phone discontinued undated (3 pages).
Catalyst 5000 Series; undated (12 pages).
Donnan, et al; "Token Ring Access Method and Physical Layer Specifications"; ANSI/IEEE Standard for Local Area Networks; ANSI/IEEE 802.5; 44-pages, 1985.
Gershon, E., "FDDI on Copper with AMD PHY Components"; Advanced Micro Devices, Inc.; 8-pages, 1991.
Gibson et al; Fibre Data Distributed Interface (FDDI)—Token Ring Physical Layer Medium Dependent (PMD); American National Standard for Information Systems; ANSI X3.166-1990; 56 pages, 1990.
Gibson et al; Fiber Distributed Data Interface (FDDI)—Token Ring Physical Layer Protocol (PHY); American National Standard for Information Systems; ANSI X3.148-1988; 34 pages, 1988.
Lavoisard, J. L. et al; "ISDN Customer Equipments"; Communication and Transmission, No. 3, 17-pages, 1987.
Lohse, et al; Fiber Distributed Data Interface (FDDI)—Token Ring Media Access Control (MAC); American National Standard for Information Systems; ANSI X3.139-1987; 62 pages; 1987.
Keller et al; "Performance Bottlenecks in Digital Movie Systems"; Proceedings of the 4th International Workshop on Network and Operating System Support for Digital Audio and Video, 1993, 9-pages.
Stallings, W., Local Networks, An Introduction, pp. ii, xii-xvi, pp. 373-381, 8-pages, 1984.
48-Volt DC Power Supply Connection Guide; 3Com Published Mar. 2000 (12 pages).
SuperStack II PS Hub User Guide; 3Com Published Jul. 1997 (188 pages).
SuperStack II Entry Hub User Guide; 3Com Published Nov. 1996 (8 pages).
SuperStack II Baseline Switch User Guide; 3Com Published Mar. 1998 (8 pages).
SuperStack II Baseline 10/100 switch; 3Com Published Apr. 1998 (8 pages).
SuperStack II Desktop Switch User Guide; 3Com Published Jun. 1997 (148 pages).
SuperStack II Switch 610 User Guide; 3Com Published May 1999 (54 pages).
Line carrier modems—1: Build a Pair of Line-Carrier Modems (Part 1); Radio Electronics, Jul. 1988, pp. 87-91 by Keith Nichols (7 pages).
Line carrier modems—2: Build a Pair of Line-Carrier Modems (Part 2); Radio Electronics, Aug. 1988, pp. 88-96 by Keith Nichols (5 pages).
Universal Serial Bus Specification Revision 1.0; Jan. 15, 1996 (268 pages).
'The Complete Modem Reference', Third Edition, by Gilbert Held, 1997, ISBN: 0-471-15457-1 (488 pages).
'High-Speed Networking with LAN Switches', by Gilbert Held, 1997, ISBN: 0-471-18444-6 (281 pages).
'Interconnections Bridges and Routers', by Radia Perlman, 1992, ISBN: 0-201-56332-0 (393 pages).
'Macworld Networking Bible', Second Edition pp. 1-331, by Dave Kosiur and Joel M. Snyder, 1994, ISBN: 1-56884-194-9 (354 pages).
'Macworld Networking Bible', Second Edition pp. 332-688, by Dave Kosiur and Joel M. Snyder, 1994, ISBN: 1-56884-194-9 (363 pages).
'High-Speed Cable Modems', pp. 1-246 by Albert A. Azzam, 1997, ISBN: 0-07-006417-2 (276 pages).
'High-Speed Cable Modems', pp. 247-570 by Albert A. Azzam, 1997, ISBN: 0-07-006417-2 (321 pages).
Cisco's 2600 Series Routers, "Quick Start Guide: Cisco 2610 Router, Cabling and Setup," published in 1998.
NBX Corporation's NBX 100,"Network Based Exchange: The Complete Communications Solution," published in 1997.
Kevin Fogarty, "ZAP! NetWare users get really wired—over electric power lines," Network World, Jul. 3, 1995.
*Serconet, Ltd*., v. *Netgear, Inc*. Case No. CV-06-04646 PJH, Defendant's Invalidity Contentions, Jan. 29, 2007.
*Serconet, Ltd*., v. *Netgear, Inc*. Case No. CV-06-04646 PJH, Order Construing Claims, Jul. 30, 2007.
*Serconet, Ltd*., v. *Netgear, Inc*. Case No. CV-06-04646 PJH, Claim Comparison Chart for USP 6,480,510, Jan. 29, 2007.
*Serconet, Ltd*., v. *Netgear, Inc*. Case No. CV-06-04646 PJH, Claim Comparison Chart for USP 7,016,368, Jan. 29, 2007.
*Serconet, Ltd*., v. *Netgear, Inc*. Case No. CV-06-04646 PJH, Claim Comparison Chart for USP 7,035,280, Jan. 29, 2007.
NetSpeed, "SpeedRunner 202 Customer Premise ATM ADSL Router" published 1997.
Compaq Deskpro 4000S Series of Personal Computers, published in Jul. 1997.
Strassberg, Dan; "Home Automation Buses: Protocols Really Hit Home"; EDN Design Feature, Apr. 13, 1995 (9 pages).
Mark Hachman, Compaq to Ride The CEBus; EBN Jan. 22, 1996 (1 page).

Hoffman, J.; "Cable, Television, and the Consumer Electronic Bus"; Panasonic Technologies. Inc., pp. 165-173.
IS-60.04; Node Communications Protocol Part 6: Application Layer Specification; Revision Apr. 18, 1996 (129 pages).
Markwalter E. Brian, et al,; CEBus Router Testing; IEEE Transactions on Consumer Electronics Nov. 1991, vol. 37 No. 4 (8 pages).
Heite C et al: "Powernet—Das Neue Eib-Medium", Elektrotechnik und Informationstechnik, Springer Verlag, Wein, AT, vol. 114, No. 5, 1997, pp. 254-257.
Stallings, W., Local Networks, An Introduction, 51-pages, 1984.
Stallings, W., Local Networks, 2nd edition, 12-pages, 1987.
Stallings, W., Local Networks, 3nd edition, 14-pages, 1990.
Strole, N.: "The IBM Token-Ring Network—A functional Overview"; IEEE Network Magazine, vol. 1, No. 1, 8-pages, 1987.
Willett, M., Token-ring Local Area Networks—An Introduction; IEEE Network Magazine, vol. 1, No. 1, 6-pages, 1987.
An Interoperable Solution for FDDI Signaling Over Shielded Twisted Pair; Advanced Micro Devices, Inc., 18-pages, 1991.
"Integrated Services Digital Network (ISDN)", International Telecommunications Union, vol. III, Fascicle III .8, 9-pages, 1988.
Lon Works LPI-10 Link Power Interface Module User's Guide; Echelon Corporation, 1995 (37 pages).
Lon Works LPT-10 Link Power Transceiver User's Guide Version 2.1; Echelon Corporation, 1995 (60 pages).
Lon Works Router User's Guide Revision 3; Echelon Corporation, 1995 (68 pages).
Using the Lon Works PLT-22 Power Line Transceiver in European Utility Application, Version 1; Echelon Corporation, 1996-1999 (118 pages).
PL3120/PL3150 Power Line Smart Transceiver Data Book, Version 2; Echelon Corporation, 1996-2005 (255 pages).
PL DSK 2.1 Power Line Smart Transceiver Development Support Kit User's Guide; Echelon Corporation, 2005-2006 (18 pages).
Introduction to Pyxos FT Platform; Echelon Corporation, 2007 (34 pages).
LTM-10A User's Guide, Revision 4; Echelon Corporation, 1995-2001 (46 pages).
Lon Works Twisted Pair Control Module, User's Guide Version 2; Echelon Corporation, 1992-1996 (50 pages).
AN1000EVK Evaluation Unit Manual, Draft 1.0; Adaptive Networks Inc., Document No. 04-3170-01-B Aug. 1996 (31 pages).
AN1000 Powerline Network Communications Chip Set, Adaptive Networks Inc., 1995 (56 pages).
From the Ether—Bob Metcalfe, 'Cheap, reliable 'net connections may be as close as an electrical socket'; by Bob Metcalfe Info World Feb. 10, 1997 vol. 19 Issue 6 (4 pages).
Lon Works Custom Node Development, Lon Works Engineeering Bulletin; Echelon Corporation, Jan. 1995 (16 pages).
Building a Lon Talk-to-PLC Gateway, Lon Works Engineering Bulletin; Echelon Corporation, May 1994 (62 pages).
Lon Works 78kbps Self-Healing Ring Architecture, Lon Works Marketing Bulletin; Echelon Corporation, Aug. 1993 (6 pages).
Centralized Commerical Building Applications with the Lon Works PLT-21 Power Line Transceiver, Lon Works Engineering Bulletin; Echelon Corporation, Apr. 1997 (22 pages).
Lon Works for Audio Computer Control Network Applications; Echelon Corporation, Jan. 1995 (30 pages).
Demand Side Management with Lon Works Power Line Transceivers, Lon Works Engineering Bulletin; Echelon Corporation, Dec. 1996 (36 pages).
'Switching Hubs—Switching to the Fast Track', by Gary Gunnerson, PC Magazine, Oct. 11, 1994 (24 pages).
VISPLAN-10 Infrared Wireless LAN system; JVC May 1996 (10 pages).
'JVC Introduces Ethernet Compatible Wireless LAN System'; Business Wire Sep. 26, 1995 (1 page).
Ethernet Wireless LAN Systems; BYTE Feb. 1996 (3 pages).
'JVC Introduces First Ethernet Compatible Wireless LAN System'; Business Wire Nov. 8, 1935 (1 page).
Intelogis to Present on Stage at Internet Showcase 1998; PR Newswire Jan. 28, 1998 (1 page).
PassPort PC Plug in Quick Setup Guide; Intelogis P/N 30030202, date unknown (8 pages).
High Speed Networking with LAN Switches, by Gilbert Held; Copyright 1997 by John Wiley & Sons, Inc. (290 pages).
Claim Chart presented in request for reexamination of U.S. Patent No. 6,480,510 request filed Jun. 10, 2009.
Claim Chart presented in request for reexamination of U. S. Patent No. 5,841,360 request filed May 26, 2009.

* cited by examiner

LOCAL AREA NETWORK OF SERIAL INTELLIGENT CELLS

This is a continuation of patent application Ser. No. 10/178,223, filed Jun. 25, 2002, now U.S. Pat. No. 7,016,368 which itself is a continuation of U.S. patent application Ser. No. 09/123,486 filed Jul. 28, 1998, now U.S. Pat. No. 6,480,510, issued Nov. 12, 2002

FIELD AND BACKGROUND OF THE INVENTION

The present invention relates to local area networks and, more particularly, to local area network topologies based on serial intelligent cells.

Bus Topology

Most prior art local area networks (LAN) use a bus topology as shown by example in FIG. 1. A communication medium 102 is based on two conductors (usually twisted pair or coaxial cable), to which data terminal equipment (DTE) units 104, 106, 108, 110, and 112 are connected, via respective network adapters 114, 116, 118, 120, and 122. A network adapter can be stand-alone or housed within the respective DTE.

This prior art bus topology suffers from the following drawbacks:

1. From the point of view of data communication, the medium can vary significantly from one installation to another, and hence proper adaptation to the medium cannot always be obtained.

2. The bus topology is not optimal for communication, and hence:
   a) the maximum length of the medium is limited;
   b) the maximum number of units which may be connected to the bus is limited;
   c) complex circuitry is involved in the transceiver in the network adapter;
   d) the data rate is limited.

3. Terminators are usually required at the ends of the medium, thus complicating the installation.

4. Only one DTE can transmit at any given time on the bus, and all other are restricted to be listeners.

5. Complex arbitration techniques are needed to determine which DTE is able to transmit on the bus.

6. In case of short circuit in the bus, the whole bus malfunctions, and it is hard to locate the short circuit.

7. Addresses should be associated independently with any network adapter, and this is difficult to attain with bus topology.

Star Topology

A number of prior art network devices and interconnections summarized below utilize star topology.

The multiplexer is a common item of equipment used in communication, both for local area networks and wide-area networks (WAN's). It is used in order to provide access to a data communications backbone, or in order to allow sharing of bandwidth between multiple stations. As shown in FIG. 2, one side of a multiplexer 202 is usually connected to a single high data rate connection 204 ("highway"), but several such connections can also be used. The other side of multiplexer 202 has multiple low data rate connections 206, 208, 210, 212, and 214. The ellipsis . . . indicates that additional connections can be made. Each low data rate connection uses part of the bandwidth offered by the high data rate connection. These low data rate connections can be of the same type or different types, and can have different or identical data rates.

The multiplexing technique most commonly used is time-domain multiplexing (TDM). However, frequency-domain multiplexing (FDM) is also used.

A popular multiplexer in use is the voice multiplexer, shown in FIG. 3. A pulse-code modulation (PCM) bus 304 handling 2.048 megabits per second, containing 30 channels of 64 kilobits per second is connected to one side of a PABX/PBX 302, and up to 30 telephone interfaces 308, 312, and 316 are connected to the other side via connections 306, 310, and 314. The ellipsis . . . indicates that additional connections can be made. In this configuration, each channel in the PCM bus can be switched or be permanently dedicated to a specific telephone line. An example of such system is disclosed in U.S. Pat. No. 3,924,077 to Blakeslee.

Similarly a small private branch exchange (PABX/PBX), as shown in FIG. 4, is widely used (usually in an office or business environment) where several outside lines 403, 404, and 405 are connected to one side of a PABX/PBX 402, and multiple telephones 408, 412, and 416 are connected to the other side via lines 406, 410, and 414, respectively. The ellipsis . . . indicates that additional connections can be made. The PABX/PBX connects an outside line to a requesting or requested telephone, and allows connection between telephones in the premises.

In the configurations described above, star topology is used in order to connect to the units to the multiplexer, which functions as the network hub. The disadvantages of star topology include the following:

1. A connection between each unit and the network hub is required, and the wiring required for this connection can involve a lengthy run.

Thus, when adding new unit, an additional, possibly lengthy, connection between the new unit and the network hub must be added.

2. No fault protection is provided: Any short circuit or open circuit will disrupt service to the affected units.

3. The multiplexer can impose extensive space and power requirements.

Computer Interfaces

Various interface standards have been established in order to allow interoperability between the PC (personal computer) or workstation and its various connected elements. These standards usually relate to both mechanical and electrical interfaces, and include industry standard architecture (ISA), extended industry standard architecture (EISA), Personal Computer Memory Card Industry Association (PCMCIA), intelligent drive electronics (IDE), small computer system interface (SCSI), and others. Each added hardware unit usually utilizes a specific software driver for interoperability with the specific platform. These protocols are applicable to small distances only, and allow units to be housed within or nearby the PC or workstation enclosures. For example, equipping a PC for video capture could involve a plug-in ISA card housed within the PC on the motherboard, a video camera connected to the card, and a software driver. This configuration does not allow remote video monitoring.

Relevant Prior Art

The use of the same wire pair or pairs for both power and data communication is well known, and is widely used in telecommunications, from "Plain Old Telephone Service" ("POTS") to Integrated Services Digital Network (ISDN) and broadband services in the local-loop including other Digital Subscriber Line (xDSL) technologies. Such a concept is described, for example, in U.S. Pat. No. 4,825,349 to Marcel, describing using two pairs for such a scheme. A DC-to-DC converter for such DC feeding is described, for example, in U.S. Pat. No. 4,507,721 to Yamano et al.

The concept of power line communication (PLC) is also widely known. However, in most cases the connection is similar to a LAN environment, in which a single transmitter occupies the entire medium. Examples of such techniques include X-10 and the consumer electronics bus (CEBus, described in the EIA-600 standard). Much of this technology uses complex spread-spectrum techniques in order to accommodate problematic media (characterized by high amounts of noise and interference). Even with such improved technologies, however, the data rate obtained is relatively low.

Prior art in this field includes U.S. Pat. No. 5,684,826 to Ratner, U.S. Pat. No. 5,491,463 to Sargeant et al., U.S. Pat. No. 5,504,454 to Daggett et al., U.S. Pat. No. 5,351,272 to Abraham, U.S. Pat. No. 5,404,127 to Lee et al., U.S. Pat. No. 5,065,133 to Howard, U.S. Pat. No. 5,581,801 to Spriester et al., U.S. Pat. No. 4,772,870 to Reyes, and U.S. Pat. No. 4,782,322 to Lechner et al. Other patents can be found in U.S. Class 340/310 (sub-classes. A/R and others) and International Class H04M 11/04.

The concept of using existing telephone wiring also for data communication is first disclosed in U.S. Pat. No. 5,010,399 to Goodman et al., where video signals superimposed over the telephone signals are used. However, the scheme used is of the bus type and has the drawbacks of that topology. Similarly, the idea of data transmission over a public switched telephone network (PSTN) using the higher frequency band is widely used in the XDSL systems, as is disclosed in U.S. Pat. No. 5,247,347 to Litteral et al. The patent discloses an asymmetric digital subscriber line (ADSL) system. However, only a single point-to-point transmission is described over the local-loop, and existing in-house wiring is not discussed, and thus this prior art does not disclose how to configure a full multipoint network. Multiplexing XDSL data and the POTS/ISDN data uses FDM principles, based on the fact that the POTS/ISDN services occupy the lower portion of the spectrum, allowing for the XDSL system to use the higher bandwidth.

A home bus network using dedicated wiring is disclosed in U.S. Pat. No. 4,896,349 to Kubo et al., and a home automation network based on a power line controller (PLC) is disclosed in U.S. Pat. No. 5,579,221 to Mun. U.S. Pat. No. 4,714,912 to Roberts et al. is the first to suggest communicating data over power lines not in bus topology but as 'break-and-insert'. However, only single conductor is used, and the receivers are all connected again using a bus topology.

In addition, U.S. patent application Ser. No. 08/734,921, Israel Patent Application No. 119454, and PCT Patent Application No. PCT/IL97/00195 of the present inventor disclose a distributed serial control system of line-powered modules in a network topology for sensing and control. These documents, however, do not disclose a local area network for data communications.

The prior art documents mentioned above are representative examples in the field. Certain applications are covered by more than one issued patent.

There is thus a widely recognized need for, and it would be highly advantageous to have, a means of implementing a local area network for data communications which does not suffer from the limitations inherent in the current methods. This goal is met by the present invention.

SUMMARY OF THE INVENTION

The present invention is of a local area network for data communication, sensing, and control based on serially connected modules referred to as "serial intelligent cells" (SIC's). An example of a local area network of such devices according to the present invention is illustrated in FIG. 7, to which reference is now briefly made. In this example, SIC's 700, 702, 704, 706, and 708 are connected by one or more conducting wire pairs (such as a twisted pair 710). This allows chaining, such as SIC 700 to SIC 702 to SIC 704. However, SIC 700, SIC 706, and SIC 708, located at the ends are equipped with single connection. SIC 704 is equipped with three connections, and even more connections are possible. A SIC may be interfaced to one or more DTE's, as illustrated by a DTE 714 interfaced to SIC 700 and by DTE's 716 and 718 interfaced to SIC 704. SIC's need not have an interface, however, as is illustrated by SIC 706 and SIC 702. SIC 702, though, serves as a repeater, connecting SIC 700 and SIC 704. It is to be noted that the networks according to the present invention utilize electrically-conducting media to interconnect the SIC's. Each electrically-conducting medium connects exactly two SIC's into a communicating pair of SIC's which communicate bidirectionally and independently of other communicating pairs in the local area network. Electrically-conducting media are media which transmit signals by conducting electrical current or by propagating electrical potential from one point to another. Electrically-conducting media include, but are not limited to wires, twisted pair, and coaxial cable. But electrically-conducting media do not include media such as fiber optic lines, waveguides, microwave, radio, and infrared communication media.

As noted above, SIC's in a communicating pair communicate bidirectionally. For example, SIC 704 can initiate communication (as a sender) to SIC 702 (as a receiver), but SIC 704 can just as well initiate simultaneous communication (as a sender) to SIC 700 (as a receiver). Bidirectional communication can take place simultaneously, and herein is taken to be equivalent to "full duplex" communication. In addition, as noted above, the communication between the SIC's of a communicating pair is independent of the communication between the SIC's of any other communicating-pair, in that these communications neither preclude nor affect one another in any way. Furthermore, every communication between SIC's is a "point-to-point communication", which term herein denotes a communication that takes place between exactly one sender and exactly one receiver. This is in contrast to a bus-based communication, in which there are many (potential) receivers and many (potential) senders. Consequently, in the topology according to the present invention, there is automatically a termination in the physical layer at each end of a connection (a SIC), both simplifying the installation and insuring more reliable communication.

The topology according to the present invention is superior to the prior art bus topology in the following ways:

1. There is no physical limit to the number of SIC's which may be installed in the network, and hence no physical limit to the number of DTE's in the network.

2. Point-to-point communication allows higher data rates over greater distances.

3. Point-to-point communication requires less complex circuitry than bus circuitry.

4. Several SIC's can transmit and receive simultaneously. For example, SIC 700 can communicate with SIC 702 while SIC 704 communicates simultaneously with SIC 706.

5. There is no need for arbitration, allowing more efficient utilization of the network. Furthermore, priorities can be assigned to each SIC or, alternatively, to each specific message to allow the data routing to take care of priorities.

6. Addresses may be assigned by the network.

7. In the case of failure of any conductor or SIC, the network can sense the fault immediately, and the specific location of the fault (up to the specific SIC pair) is easily obtained.

Therefore, according to the present invention there is provided a local area network for data communication, sensing, and control including a plurality of serial intelligent cells interconnected exclusively by electrically-conducting media into at least one communicating pair, wherein: (a) each of the electrically-conducting media interconnects no more than two of the serial intelligent cells; (b) each of the communicating pair includes one of the electrically-conducting media and exactly two of the serial intelligent cells; (c) each of the communicating pair engages in a communication exclusively over the electrically-conducting media; and (d) each of the communicating pair engages in the communication bidirectionally and independently of the communication of any other of the communicating pair.

BRIEF DESCRIPTION OF THE DRAWINGS

The invention is herein described, by way of example only, with reference to the accompanying drawings, wherein.

DESCRIPTION OF THE PREFERRED EMBODIMENTS

The principles and operation of a local area network according to the present invention may be better understood with reference to the drawings and the accompanying description.

Figure 1:
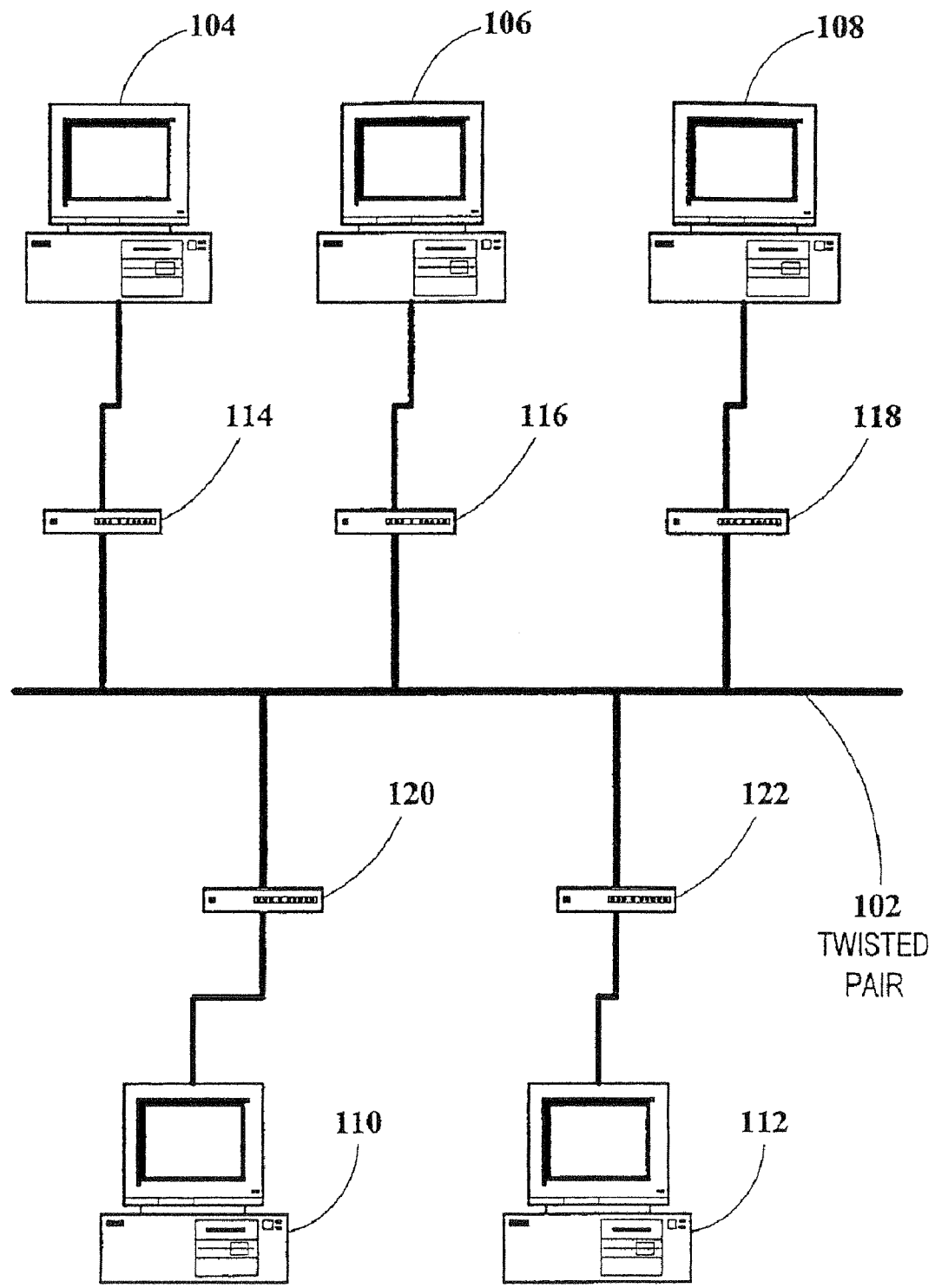
FIG. 1 shows a common prior art LAN bus topology.
Figure 2:
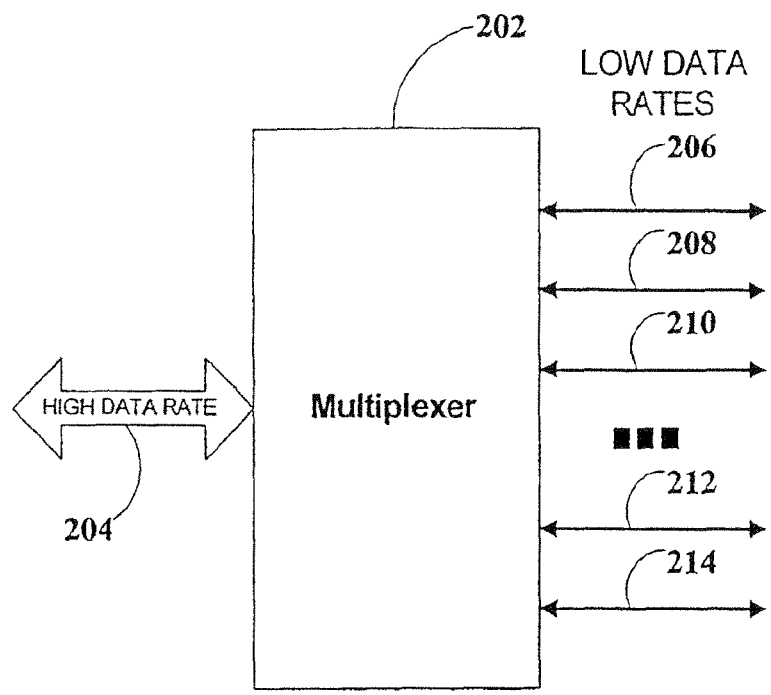
FIG. 2 shows a typical prior art multiplexer.
Figure 3:
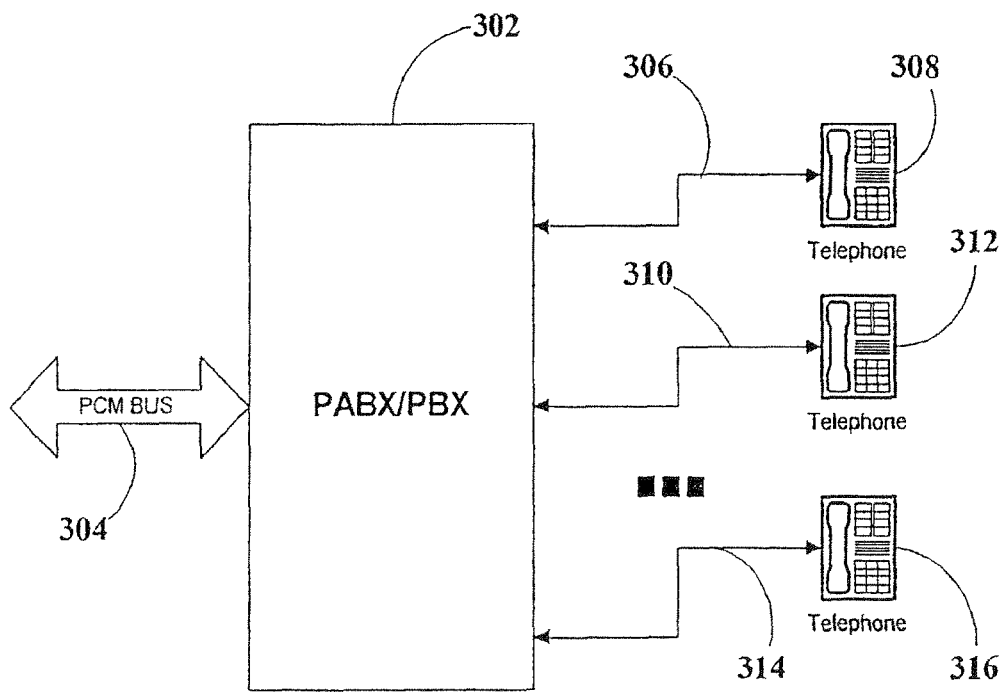
FIG. 3 shows a prior art voice multiplexer (star topology).
Figure 4:
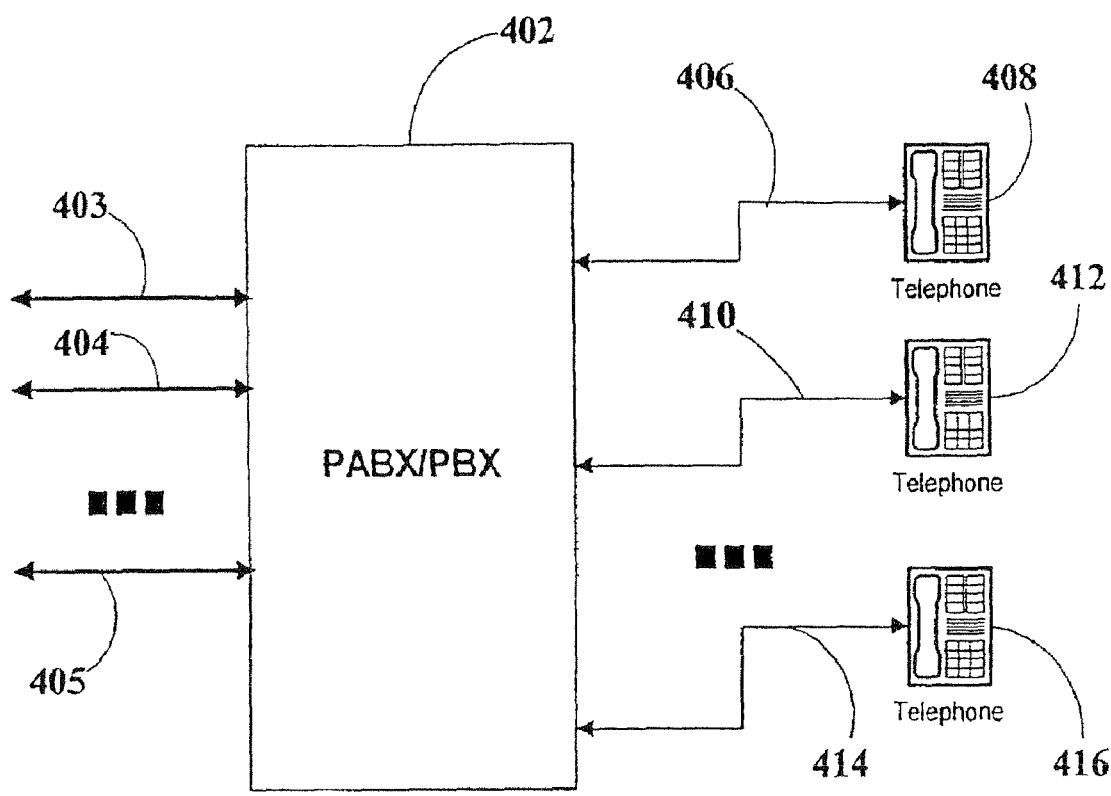
FIG. 4 shows a prior art voice exchange configuration (star topology).
Figure 5:
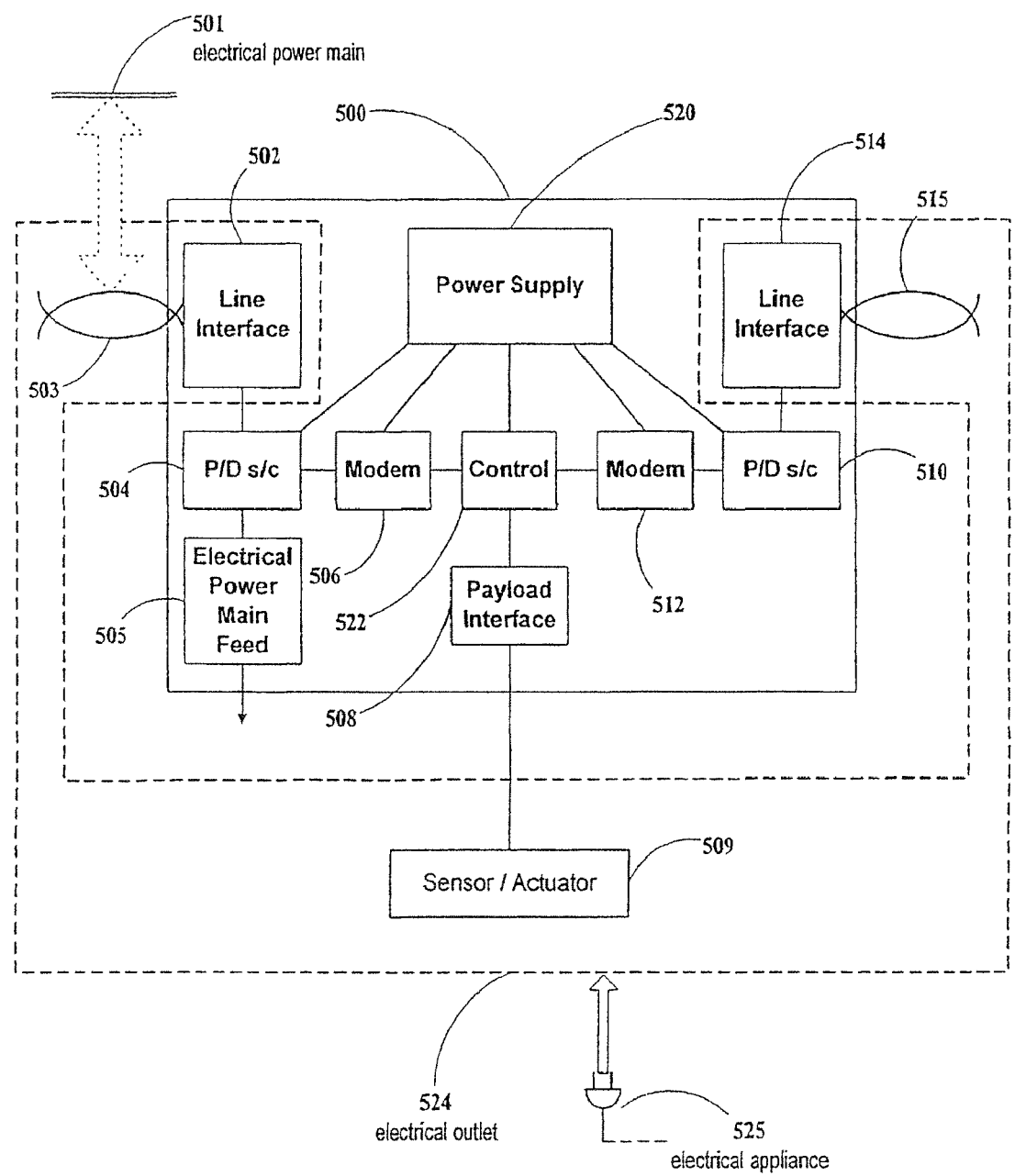
FIG. 5 is a block diagram of a SIC for control applications according to the present invention.

FIG. 5 is a block diagram of a representative SIC 500 for use in control applications. A first line interface 502 is a first port for connecting to the previous SIC to receive incoming electrical power and local area network data over electrically-conducting medium 503, which may optionally be connected to an electrical power main 501, so that SIC 500 may be powered from electrical power main 501. Line interface 502 may include the connector, fuse, lightning arrester and other protection such as noise filters, etc. The incoming power/data signal is fed to a first power/data splitter/combiner 504, which de-couples the (high frequency alternating current) data signal from the power. Such a power/data splitter/combiner 504 (denoted for brevity in FIG. 5 as "P/D s/c") can be implemented by methods well-known in the art, such as using a center-tap transformer, or alternatively with active components. The data signal is fed to a first modem 506 allowing bidirectional communication, while the power is fed to a power supply 520. The above scheme assumes that both power and data are carried by the same network wires (line-powering). FIG. 5 illustrates the case where the SIC is line-powered by alternating current (for example, by the electrical power main), in which case power/data splitter/combiner 504 is an AC power/data splitter/combiner, which separates a low-frequency alternating current power from the higher-frequency data signal. Otherwise, in the case where the SIC is line-powered by direct current, power/data splitter/combiner 504 is a DC power/data splitter/combiner, which separates direct current power from the data signal. In some cases the line-powering method is not used. For example, power can be carried by dedicated lines routed in conjunction with the data wiring. Alternatively, the SIC can be locally powered by a local power-supply. In both cases, the power/data splitter/combiner is not required, and the power lines are directly connected to the SIC power-supply, while the data connects directly to the modems. Parts of the SIC are shown optionally housed within an electrical outlet 524, such that connections to the local area network as well as to the electrical power mains may be made from electrical outlet 524. Electrical power from electrical outlet 524 can be fed to an optional electrical appliance 525. In addition, SIC 500 contains an optional electrical power main feed 505 which can also power electrical appliances or other devices.

Power-supply 520 provides the required voltages for the SIC and payload operation, and also outputs the power to a second Power/data splitter/combiner 510, for coupling to the next SIC. Communication with the next (fed) SIC is performed via a second modem 512 connected to a second line interface 514 via power/data splitter/combiner 510, similar to power/data splitter/combiner 504 as previously described. Line interface 514 feeds to electrically-conducting medium 515, which connects to the next SIC. Modems 506 and 512 can be standard RS-485, RS-232, or any simple similar data interface transceiver. Alternatively, a complex transceiver can be used for achieving long ranges or high-speed operation. CPU and firmware contained in a control block 522 control and monitor the unit operation and communication, as well as control the payload through a payload interface 508 interfacing with a payload illustrated by a sensor/actuator 509. For example, interface 508 can implement a 4-20 ma standard interface. In a similar way, SIC 500 can be used for communication over the power line. To do this, payload interface 508 is replaced by a communication port and sensor/actuator 509 will be replaced by a DTE.

Figure 6:
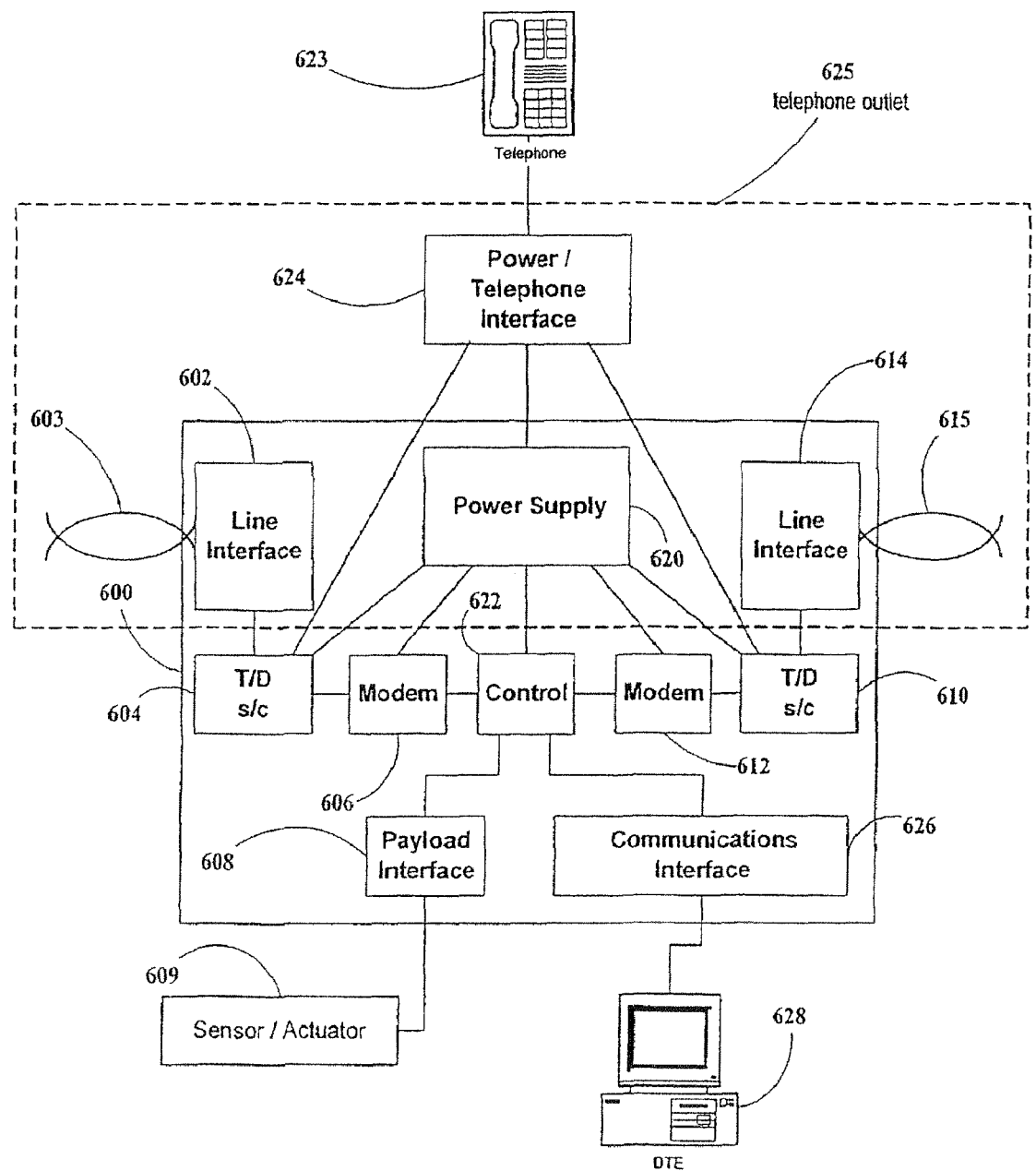
FIG. 6 is a block diagram of a SIC for data communications according to the present invention.

A SIC for use in data communications as shown in FIG. 6 is substantially similar to that used in control applications as shown in FIG. 5, but has some specific differences as noted. Also illustrated in FIG. 6 is the case where the local area network data is carried over electrically-conducting media which are part of the telephone wiring of a building. A SIC 600 has a first line interface 602 as a first port for connecting to the previous SIC to receive incoming power, local area network data, and telephony data via an electrically-conducting medium 603. Line interface 602 may include the connector, fuse, lightning arrester and other protection such as noise filters, etc. The incoming power/telephony/data signal is fed to a first telephony/data splitter/combiner 604 (denoted for brevity in FIG. 6 as "T/D s/c"), which de-couples the local area network data from the power and telephony data. Such a telephony/data splitter/combiner 604 can be implemented by methods well-known in the art, such as using a high-pass/low pass filter, or alternatively with active components. The local area network data signal is fed to a first modem 606 allowing bidirectional communication, while the power (DC) is fed to a power supply 620, and the telephony data is fed to power/telephone interface 624.

Power-supply 620 provides the required voltages for the SIC and payload operation, and also outputs the power to a second telephony/data splitter/combiner 610, for coupling to the next SIC. Communication with the next (fed) SIC is performed via a second modem 612 connected to a second line interface 614 via telephony/data splitter/combiner 610, similar to telephony/data splitter/combiner 604 as previously described. Line interface 614 connects to an electrically-conducting medium 615, which connects to the next SIC. Modems 606 and 612 can be standard RS-485, RS-232 or any simple similar data interface transceiver. Alternatively, a complex transceiver can be used for achieving long ranges or high-speed operation. CPU and firmware contained in a control block 622 control and monitor the unit operation and communication, as well as control the payload through a payload interface 608 interfacing with a payload 609, which may include sensors and actuators. For example, interface 608 can implement a 4-20 ma standard interface. SIC 600 also includes an optional power/telephone interface 624, contained for example in a telephone outlet 625, as well as one or more communications interfaces, such as a communication interface 626 connected to a DTE 628.

In the case of DC line feeding, the power supply may be equipped with a line reversal function (for example, a diode-based bridge) in order to accommodate a possible wire reversal.

Note that a SIC can be implemented as single device with all component parts contained within one enclosure, but does not necessarily have to be so implemented. In the case of a SIC used for data communications or control applications, the hardware may be optionally divided between the SIC module and the DTE/Payload units. In the case of a SIC used for telephone applications, the hardware may optionally be divided between the SIC, the DTE payload unit, and the telephone outlet, such as telephone outlet 625, which allows connections to both telephone services (such as through a telephone 623) and the local area network (such through DTE 628). Telephone outlet 625 may be a wall outlet or jack. All or part of the SIC may be housed within a telephone outlet such as telephone outlet 625, if desired. Furthermore, for SIC's used only as repeaters, a payload interface is not necessary.

Power/data splitter/combiner 510 (FIG. 5) can use various techniques known in the art. Coupling can be implemented, for example, as disclosed in U.S. Pat. No. 4,745,391 to Gajjar. Power-supply 520 (FIG. 5) can be connected to the network using dedicated adapter or via specific SIC. The payload can also be connected using standard Ethernet or other LAN interface, hence emulating the network using the SIC's. This configuration makes use of standard interfaces, but operates at higher throughput and data-rates than a conventional LAN.

SIC Addressing

A SIC can include an address. Addresses of SIC's on the network can be assigned via automatic assignment by the local area network itself by algorithms known in the art, for example as disclosed in U.S. Pat. No. 5,535,336 to Smith et al. Addresses can also be assigned via manual assignment, such as by the setting of mechanical switches on the SIC unit. Addresses can also be determined by the DTE connected to the SIC, either by means of higher layers as done in most LAN systems, or physically be means of the connection to the SIC (such as by address lines).

SIC Powering

Figure 7:
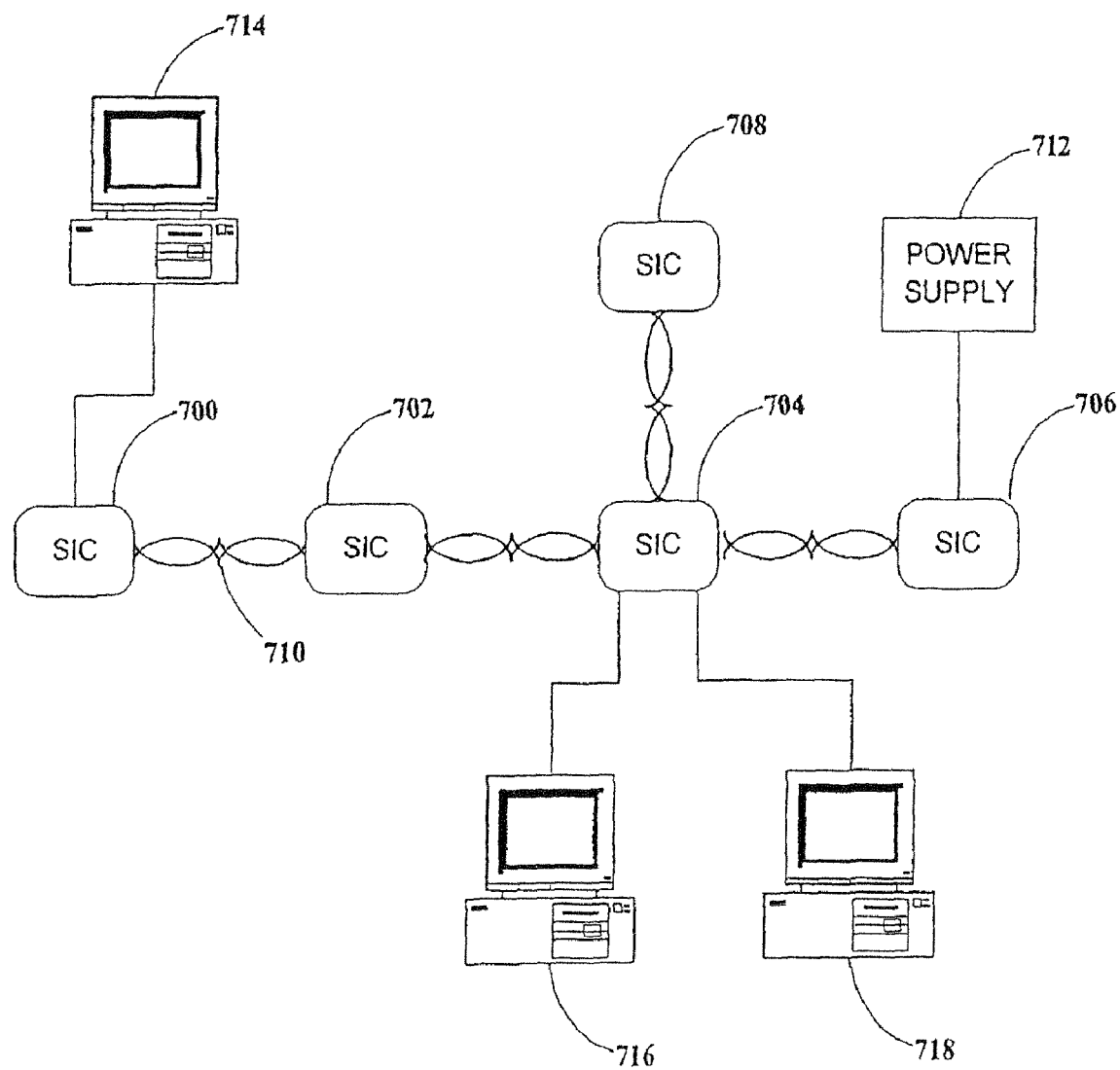
FIG. 7 shows a LAN topology utilizing the devices of the present invention.

A SIC can receive electrical power locally, via a power source located near the SIC. However, one power source may be used to power some or all the SIC's in the local area network using dedicated power lines. These lines can be routed with the data communication wires. Alternatively, the same electrically-conducting media (the data communication wires) can be used to carry both electrical power and local area network data to the SIC's, by means of techniques well-known in the art, for example as in telephone systems. In such a case, a unit is required for coupling the power supply to the local area network. This can make use of a SIC (such as SIC 706 in FIG. 7) or in a specific dedicated module. Since electrical power is typically distributed at low frequencies (e.g., 60 Hertz), whereas local area network data is typically at a much higher frequency, electrical power can be combined with local area network data using frequency-domain multiplexing. A SIC can therefore be powered from the electrical power mains, and can also deliver electrical power, as illustrated in FIG. 5 and detailed herein above.

The DTE's, sensors, and actuators connected to the SIC's can also be locally powered from the SIC's, or can use the same power resources via the same channels as the SIC's. Part or all of a SIC can be housed within an electrical outlet so that the electrical outlet allows connection to the local area network as well as to electrical power.

Control

Although mainly intended to be used as communication network, the system according to the present invention can also be used as a platform to implement a sensing, control, and automation system. This is achieved by adding to one or more of the SIC's interfaces to sensors or actuators. The signals received by the sensors are transmitted over the network via logic contained in the SIC's or in the DTE's, which thereupon operate the relevant actuators. This automation function can be monitored by one or more of the DTE's.

The operation of the control may be associated with data communicated over the network (for example, sensing the availability of power to a DTE) or may be independent of it, to allow control decisions to be made locally.

DTE Interface

The DTE interface can be a proprietary interface or any standard serial or parallel interface, such as ITU-T V.35, ITU-T V.24, etc. In addition, a telephone interface (POTS) or ISDN may be used. This can suit intercom or PBX applications.

Fault Protection

Figure 8:
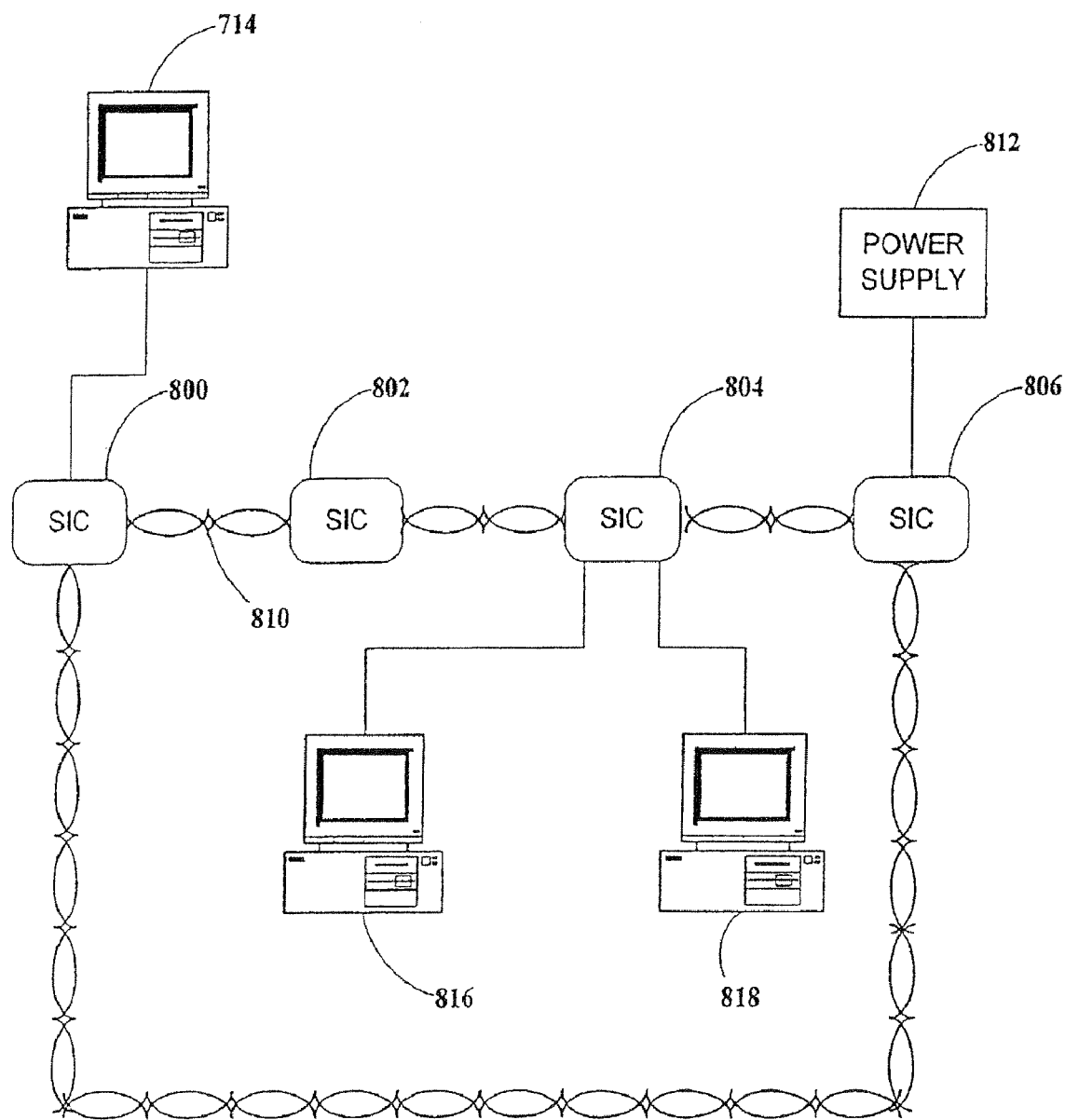
FIG. 8 shows an alternative LAN topology utilizing the devices of the present invention.

The SIC topology described above can be modified to allow for single failure correction. In such a case, the SIC's are connected in a network with redundant paths, such as a circular topology as shown in FIG. 8. In this example, a SIC 800 is connected to a SIC 802, which is in turn connected to a SIC 804, which is in turn connected to a SIC 806, which is in turn-connected to SIC 800. When connected in such configuration, any single failure in any conductor, such as in conductor pair 810, will not effect the system operation, as data routing from any SIC to any other SIC can be achieved via an alternate path. The term "circular topology" herein denotes the topology of any local area network of SIC's according to the present invention which contains at least two communication paths between two different SIC's. For example, in FIG. 8, there are two communication paths from SIC 800 to SIC 804: one communication path is from SIC 800 to SIC 802 to SIC 804, and the other path is from SIC 800 to SIC 806 to SIC 804. Circular topology provides redundant communication paths that increase the immunity of the local area network to communication faults. It should be noted that the circular topology according to the present invention, as shown in FIG. 8, differs significantly from the well-known "Token Ring topology" of the prior art, as discussed following.

Although circular topology as defined herein can be superficially similar to the Token Ring topology, there are major differences between them. One difference is in the data framing. The Token Ring uses the same frame structure throughout all communication links in the network, and this requires that the same framing must be recognized by all the cells in the network. In the SIC network according to the present invention, however, each communication link (between any two connected SIC's) is totally independent from all other network communication. Hence, a first SIC can communicate with a second SIC using one type of frame structure and protocol, while the same first SIC can communicate with a third SIC using a different type of frame structure and protocol.

In addition, in a Token Ring network, there is single direction of data flow at any given time from a single transmitter to one or more receivers, and usually, the direction of data flow is constant. The SIC network according to the present invention, however, does not impose any limitation on the data flow in any of the communication links. Full duplex, half duplex or unidirectional communication is possible, and can even vary from link to link throughout the network. This allows the SIC network to support two independent communication routes simultaneously, provided different segments are used. In FIG. 8, for example, SIC 800 can communicate with SIC 802 while SIC 804 simultaneously communicates different data with SIC 806. This capability is not supported by any of the other network configurations.

The above differences affect, for example, the vulnerability of the respective networks to faults. In case of single break or short-circuit anywhere in the medium, the Token Ring network will collapse, disabling any further communication in the system. As another example, in the network disclosed in U.S. Pat. No. 4,918,690 to Markkula et al. (hereinafter referred to as "Markkula"), this fault affects the physical layer by disabling the media's signal-carrying capability. The Token Ring network will not function at all since the data layer functionality based on unidirectional transmission will not be supported. In contrast, however, a SIC network according to the present invention, will continue to function fully, except for the specific faulty link itself. All other links continue to function normally. Furthermore, the ability to localize the fault is not easily performed either in a Token Ring network or in the Markkula network. In the SIC network according to the present invention, however, it is simple and straightforward to trace the fault to the affected link.

Data Distribution Over Electrical Power Lines

An important configuration for a network according to the present invention uses the electrical power wiring of a building as a communication media. This can be used, for example, to implement an inexpensive 'home LAN'. Typical house mains have a connection to single feeder with numerous distribution points and outlets. The principles according to the present invention specify a SIC to be located within each outlet and at each distribution point. This will allow SIC-based communications network, where communication takes place between each pair of SIC's connected via the wiring. In such a case it is also expected that the mains will also be used to power the SIC's. Aside from using the same wiring media, the electrical distribution and the communication system sharing the same mains can be totally decoupled.

Another configuration involves adding the SIC to the Mains wiring at points distinguished from the mains outlets. The preferred embodiment, however, consists of using the outlets points for both the electrical supply and the DTE connection points. This involves replacing all electrical outlets and distribution points with 'smart' outlets, having both electrical connections and a communications jack. In addition, such unit may include visual indicators (e.g. LED's) to show the communication status, and may also include switches or other means to determine the outlet address. Such a communication system could be used for applications associated with power distribution, as for example to control the load connected to a specific outlet, for remote on/off operation of appliances, timing of operations, delayed start, disconnection after pre-set time period, and so forth. Such a communication system could also be used to monitor the power consumed by specific outlets, such as for Demand Side Management (DSM) or Automatic Meter Reading (AMR), allowing remote meter reading.

The above described topology may also apply to existing wiring. One common example may be power wiring to consumers located in different locations. Such wiring typically relies on bus topology with taps. In order to use SIC technology, the wiring must be broken, and a SIC installed between both ends.

In a similar manner, a communication network employing the electrical power wiring of vehicles and vessel can be implemented, such as for aircraft, ships, trains, buses, automobiles, and so forth.

Implementing a Local Communication/Telephone System Using SIC's

In this application, existing telephone wiring (either POTS or ISDN) is used as the electrically-conducting media for the local area network, and is used for both local area network data communication and for telephony. The term "telephony" herein denotes any telephone or telephonic communication, including both including voice (POTS) and data (ISDN). Telephone outlets are usually connected in point-to-point topology without a distribution point. To set up a network, each outlet is replaced with SIC-based outlet. If there are distribution points, these distribution points must also be SIC equipped. This configuration results in a high-performance LAN between the telephone outlets. Aside from sharing the same media, the local area network can be decoupled from the telephone system. Alternatively, the local area network and the telephone system can be combined, such that telephony is digitally integrated into the local area network data.

The outside telephone service can be treated according to one of the following alternatives:

1. No telephone support. In this configuration, the connection to the network (usually to the public network) is cut, and the network is fully internal, with no external telephone service.

2. Telephone as Payload. In this configuration, the telephone capability is retained, and telephony data may be integrated into the data communication of the local area network. One of the SIC's (usually the one closest to a public telephone network interface) or other dedicated module interconnects (via the communication interface for example) to the network interface (NI). This unit emulates a telephone interface to the NI, so that public network operation is transparent and continues to perform as normal. However, the signals associated with the telephone interface, either the voice itself and the control/signaling (on hook/off hook, ringing, etc.), are digitized and transmitted in the network as data stream, as part of the communication taking place in the network. In the SIC's interfaced to telephones, these signals are converted back to analog (or in any original form) and thus can be used with standard telephones. In this case, telephone functionality is fully retained. However, failure in the communication network may result in loss of the telephone service. This can be improved by means of a system which disconnects the SIC's circuitry and restores the original wiring routing (this can be easily implemented by relays, which bypass the SIC's upon failure detection, manual intervention, or other relevant occasion).

3. Communication over POTS or ISDN. In this method, the electrically-conducting media interconnecting SIC's is the telephone wiring of a building. This method involves the known mechanism 'POTS Splitting', currently used in conjunction with XDSL technologies. This requires a filter which separates the low-frequency portion of the spectrum (usually carrying the POTS associated signals and power) from the high-frequency portion of the spectrum (used for communication). In such an application, the AC/DC units in the SIC are replaced with such POTS splitter modules. The low-frequency band (POTS related) is passed transparently (similar to the power pass), and branched to the telephone jack. The high-frequency band is used for the communication between the SIC's. This combining of high-frequency local area network communication on the same electrically-conducting media with low-frequency telephony data is a form of frequency-domain multiplexing.

In the latter two alternatives, each in-wall telephone outlet is replaced with a SIC based outlet having both a telephone jack and one (or more) communication jacks.

Computer Bus Extender

Figure 10:
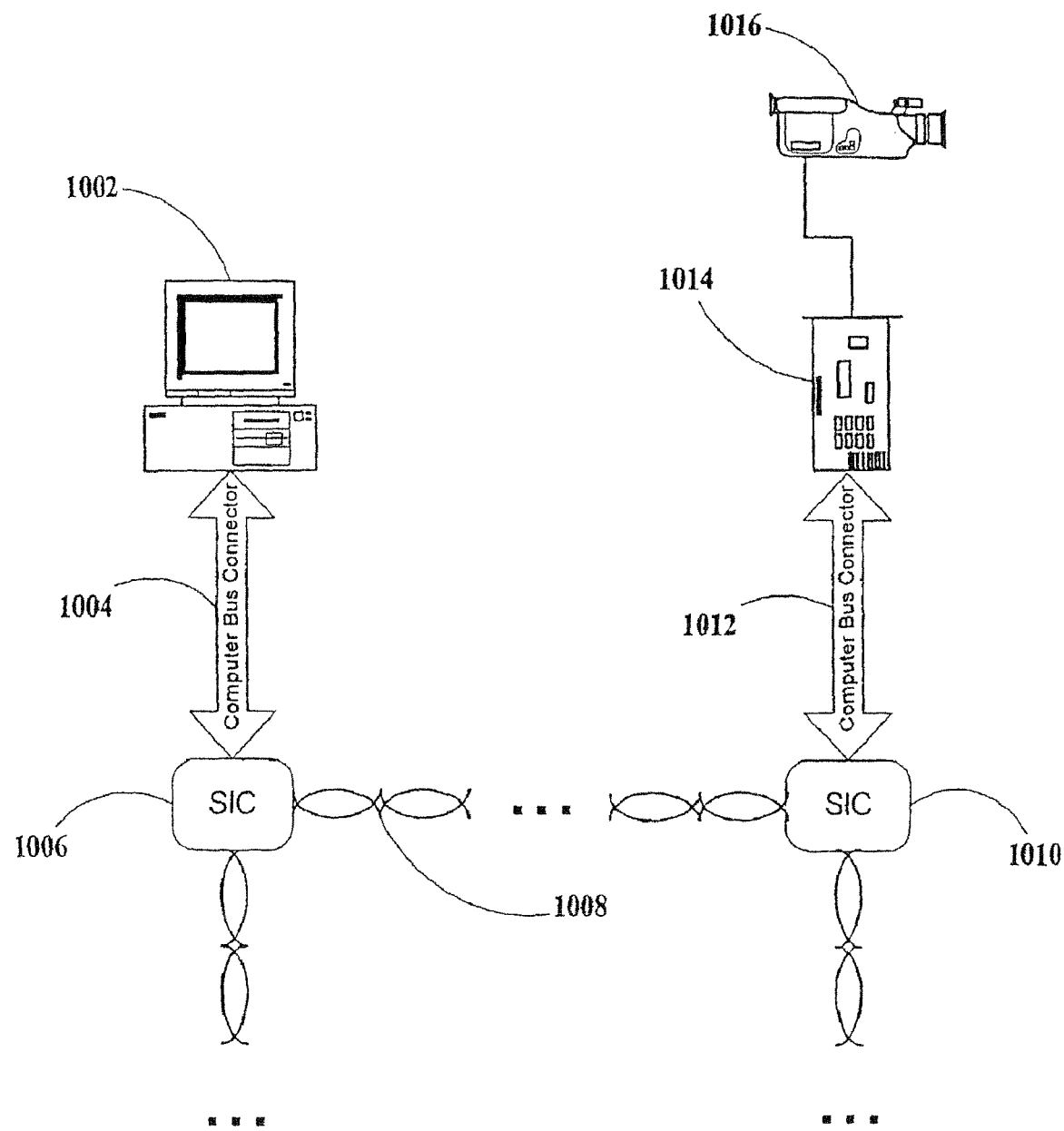
FIG. 10 shows a local area network according to the present invention used as a computer bus extender.

The SIC network can be used as a computer bus extender, such as an 'ISA bus extender', as illustrated in FIG. 10. In this configuration, a SIC 1006 is equipped with a computer bus connector 1004 which is connected, for example, to one of the ISA bus slots in a computer 1002, to transport data between the local area network and computer 1002. Another SIC 1010, remotely located, also has a computer bus connector 1012, such as an ISA bus extender. This allows for a transparent ISA bus capability, where the ISA bus data will be transported in both directions over electrically-conducting medium 1008. The ellipses ( . . . ) indicate that additional SIC's and electrically-conducting media may be present in the local area network between SIC 1006 and SIC 1010. Shown as an example, a video frame grabber card 1014 is plugged into computer bus connector 1012, and a video camera 1016 is connected to video frame grabber card 1014. Normally, video frame grabber card 1014 is plugged directly into an ISA bus slot, such as in computer 1002. Here, however, the local area network acts as a bus extender so that video frame grabber 1014 and video camera 1016 can be located remotely from computer 1002. The normal software driver for the ISA bus slot in computer 1002 can used, since computer 1002 is unaware of the fact that only ISA emulation is taking place. This way, the capability of having general remote PC components and peripherals can be easily achieved. This configuration features the above-described advantages, and this method can be used to attain various goals, such as fault protection. Similarly, this method can be used to connect several units remotely to a computer, using different ports in the computer.

Implementing Multiplexers and PABX/PBX Functionality

Figure 9:
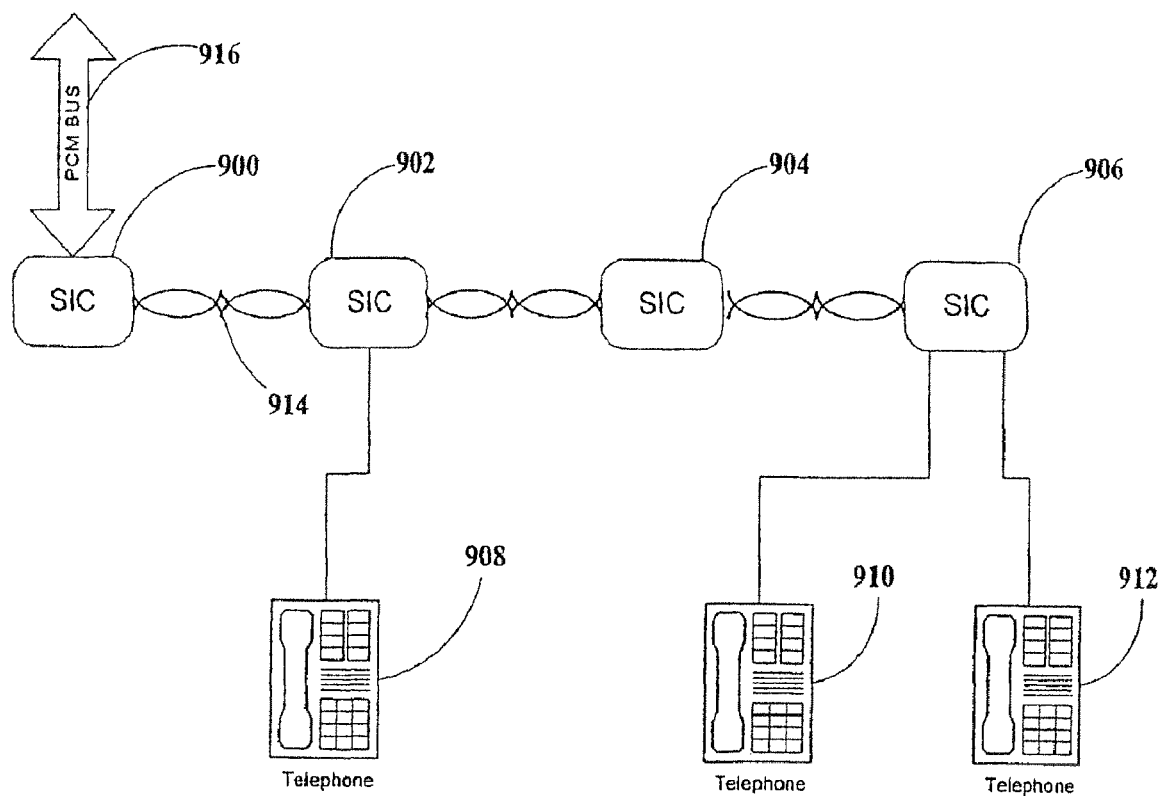
FIG. 9 shows a SIC-based multiplexer—PABX/PBX according to the present invention.

A network of SIC's may be used to implement a multiplexer or a PABX/PBX functionality, as illustrated in FIG. 9. In this example, a SIC 900 is connected to a high data rate connection, such as PCM bus 916, while SIC 902 and SIC 906 are connected to telephones 908, 910, and 912. SIC 904 functions as a repeater in this example.

In this example, the local area network functions as a multiplexer, wherein the bandwidth of the high data rate connection (PCM bus 916) is multiplexed through SIC 900 to SIC 902 and SIC 906, each of which may use a different portion of the bandwidth of the high data rate connection (PCM bus 916). Moreover, by the addition of telephones 908, 910, and 912, the local area network of FIG. 9 functions as a voice multiplexer.

Other Applications of the Invention

A number of applications of the present invention have been discussed above. Additional applications include, but are not limited to: intercom, PABX/PBX, security systems, video surveillance, entertainment broadcasting services, time (clock) distribution, and audio/video signal distribution. The networks implemented by the present invention can extend locally within a single building or over a neighborhood.

While the invention has been described with respect to a limited number of embodiments and applications, it will be appreciated that many variations, modifications and other applications of the invention may be made.

What is claimed is:

1. A local area network in a building for carrying power and digital data, said network comprising:
    a first node including a first data port for coupling to a first data unit, a second node including a second data port for coupling to a second data unit and a third node including a third data port for coupling to a third data unit;
    a first wiring segment having two ends and comprising at least one first twisted wire pair at least in part in walls of a building, wherein each end of said first wiring segment is terminated in a respective first terminating connector, at least one of the first terminating connectors is part of an outlet, said first wiring segment connects only said first and second nodes in a point-to-point connection for a first full-duplex data communication of serial digital data over said first wiring segment between the first and second nodes, and said first wiring segment concurrently carries a first DC power signal substantially without interfering with the first communication of serial digital data; and
    a second wiring segment having two ends and comprising at least one second twisted wire pair at least in part in walls of a building, wherein each end of said second wiring segment is terminated in a respective second terminating connector, at least one of the second terminating connectors is part of an outlet, said second wiring segment connects only said first and third nodes in a point-to-point connection for a second full-duplex communication of serial digital data over said second wiring segment between the first and third nodes, and said second wiring segment concurrently carries a second DC power signal substantially without interfering with the second communication of serial digital data;
wherein:
    said network is operative to effect the second communication independently from the first communication,
    said first node is connectable to a power source to be powered from the power source, and the first and second DC power signals are provided by the power source,
    said second node is at least in part powered by the first DC power signal,
    said third node is at least in part powered by the second DC power signal,
    each node is operative to couple serial digital data to a connected data unit via a respective data port for coupling to the connected data unit digital data carried over said first or second wiring segment, and
    the first and second DC power signals are current limited.

2. The network according to claim 1, wherein the first and second full-duplex communications of serial digital data are packet-based communications and said network comprises first and second fuses for respectively effecting the current limiting of the first and second DC signals.

3. The network according to claim 1 wherein each of said nodes is addressable.

4. The network according to claim 3, wherein at least one of said nodes has a manually assigned address.

5. The network according to claim 3, wherein at least one of said nodes has an automatically assigned address.

6. The network according to claim 3, wherein at least one of said nodes has an address assigned by a data unit coupled to said at least one of said nodes.

7. The network according to claim 1, wherein at least one of said nodes is either pluggable into an outlet or attachable to an outlet.

8. The network according to claim 1 configured to function as a multiplexer, wherein said first data port of said first node is coupled to the first data unit to conduct a serial digital data stream containing time multiplexed first and second data streams, the first data stream is routed via said network and coupled only to said data port of said second node for coupling to the second data unit, and the second data stream is routed via the network and coupled only to said data port of said third node for coupling to the said third data unit.

9. The network according to claim 8 configured to function as a voice multiplexer, wherein the first and said second data streams are digitized telephony signals.

10. The network according to claim 9, wherein the serial digital data stream is a PCM highway.

11. The network according to claim 1, further comprising a third wiring segment connecting said second and third nodes to impart a ring topology to said network.

12. The network according to claim 11, further operative to reroute a digital data in the event of failure of one of said wiring segments.

13. The network according to claim 1, wherein at least one of said nodes further comprises: a telephone connector connectable to a telephone set; and a converter for converting between analog telephony and digitized telephony coupled between said data port of said at least one of said nodes and said telephone connector.

14. The network according to claim 13 configured to function as an intercom, wherein two of said nodes are connectable to respective telephone sets, and said network is operative to allow said two telephone sets to communicate with each other.

15. The network according to claim 1 further operative for coupling to a computer plug-in device, wherein at least one of said nodes further comprises a standard computer bus slot coupled to said data port of said at least one of said nodes.

16. The network according to claim 1, wherein at least one of said data ports is Ethernet based.

17. The network according to claim 1, wherein at least one of said nodes is housed within a single enclosure structured to at least in part replace an existing standard outlet.

18. The network according to claim 1, wherein at least one of said nodes is attachable to a wall of a building or is at least in part housed within an outlet.

19. The network according to claim 1 further operative to power an apparatus, wherein said second node further comprises a power connector connectable to the apparatus for coupling the first DC power signal to the apparatus.

20. The network according to claim 19, wherein information carried by a data signal in said network is used to control or monitor the powering of the apparatus.

21. The network according to claim 20, wherein the control is one of: an on/off operation; timing of operations; and a delayed start.

22. The network according to claim 20, wherein the monitoring is power consumption metering.

23. The network according to claim 1, wherein at least one of the wiring segments carries digitized video or digitized voice data.

24. The network according to claim 1, wherein at least one of said wiring segments comprises dedicated DC power conductors carrying the respective DC power signal and data conductors carrying distinct from the DC power conductors and carrying the respective serial digital data.

25. The network according to claim 1, wherein at least one of said wiring segments carries the respective DC power signal and data over the same conductors.

26. The network according to claim 25, wherein the respective DC power signal and data are carried over distinct frequency bands.

27. The network according to claim 1, wherein the network is further operative to accommodate line reversal and provide power protection.

28. The network according to claim 27, wherein the line reversal function uses a diode-based bridge.

29. The network according to claim 1 further operative to function as a repeater, wherein said second and third nodes communicate with each other while said first node repeats data between said first and second wiring segments.

30. The network according to claim 1 further operative as a control network, wherein a first one of said nodes is connectable to a sensor and a second one of said nodes is connectable to an actuator, and wherein operation of the actuator is dependent upon the sensor output.

31. The network according to claim 1 further operative for remote metering, and further comprising a power meter for measuring the first DC power signal.

32. The network according to claim 31 wherein a representation of the measured value of said first DC signal is carried in one of the serial digital data.

33. The network according to claim 1 wherein at least one of said nodes is housed with a connected data unit.

34. A device for coupling power and digital data in a local area network, for use with first and second point-to-point local area network wiring segments each comprising at least one twisted-wire pair and carrying DC power and full-duplex serial digital data signals, said device comprising:

a first connector for connecting to said first wiring segment, for coupling a first DC power signal and first full-duplex serial digital data to said first wiring segment;

a first transceiver coupled to said first connector for communication of the first full duplex serial digital data with a transceiver of the same type as said first transceiver over said first wiring segment;

a second connector for connecting to said second wiring segment for coupling a second DC power signal and second full-duplex serial digital data to said second wiring segment;

a second transceiver coupled to said second connector for communication of the second full-duplex serial digital data with a transceiver of the same type as said second transceiver over said second wiring segment;

a third transceiver coupled to said first and second transceivers for full-duplex digital data communication with a data unit, a data connector coupled to said third transceiver for connecting to the data unit for coupling between the first and second full-duplex serial digital data and the data unit;

a power connector for coupling to a power source that supplies the first and second DC power signals; and first and second current limiting circuits respectively coupled between said power connector and the first and second connectors for respectively current limiting of the first and second DC power signals, wherein the first and second full-duplex serial digital data are independent and distinct from each other.

35. The device according to claim 34, wherein the full-duplex communication of serial digital data is packet-based communication, and said device is addressable.

36. The device according to claim 35, wherein said device has a manually assigned address.

37. The device according to claim 35, wherein said device has an automatically assigned address.

38. The device according to claim 35, wherein said device has an address assigned by the data unit or a further data unit coupled to said device.

39. The device according to claim 34 further functioning as a multiplexer, wherein the communication with the data unit includes communication of a serial digital data stream carrying time multiplexed first and second data streams, and wherein the first data stream is coupled only to said first transceiver, and the second data stream is coupled only to said second transceiver.

40. The device according to claim 39 functioning as a voice multiplexer, wherein the first and said second data streams are digitized telephony signals.

41. The device according to claim 40, wherein the serial digital data stream is a PCM highway.

42. The device according to claim 34 further operative for coupling to a computer plug-in member, wherein said device further comprises a standard computer bus slot coupled to said first transceiver.

43. The device according to claim 34, wherein the third transceiver and said data connector form an interface to the data unit which conforms to an Ethernet standard.

44. The device according to claim 34, further housed within a single enclosure, structured to at least in part replace an existing outlet or to be pluggable into an outlet.

45. The device according to claim 34, wherein at least one of the wiring segments carries digitized video data or digitized voice data.

46. The device according to claim 34, wherein at least one of the wiring segments carries the respective DC power signal over dedicated conductors distinct from the at least one twisted pair carrying the respective serial digital data.

47. The device according to claim 34, wherein at least one of the wiring segments carries the respective power signal and serial digital data over the same conductors, and said device further comprises a power/data combiner/splitter coupled to said first connector for combining and separating the DC power signal and serial digital data.

48. The device according to claim 47, wherein said power/data combiner/splitter is based on passive components.

49. The device according to claim 48, wherein said power/data combiner/splitter is based on a center-tapped transformer or a set including a high pass filter and a low pass filter, wherein said high pass filter passes only the serial digital data and said low pass filter pass only the DC power signal.

50. The device according to claim 34 further operative to function as a repeater, wherein said first and second transceivers are coupled to each other to transparently pass data between said first and second connectors.

51. The device according to claim 34 wherein first and second current limiting circuits are each based on a respective fuse.

52. The device according to claim 34 further operative for remote metering and further comprising a power meter for measuring or sensing the first DC power signal.

53. The device according to claim 52 wherein data representing the measured value of the first DC power signal is carried as part of one of the first and second serial digital data.

54. The device according to claim 34 wherein said device is housed with the data unit.

55. The device according to claim 34 in combination with first and second point-to-point local area network wiring segments.

56. A local area network in a building for wired coupling of a plurality of nodes, the network comprising:

first, second, third and fourth nodes; and first, second and third point-to-point wiring segments, each wiring segment comprising at least two conductors, wherein:

said first wiring segment is connected only between said first and second nodes for carrying out half-duplex or full-duplex point-to-point digital data communication of first serial digital data and for simultaneously carrying a first power signal, said first node couples the first power signal to said first wiring segment, and said second node is operative to be at least in part powered by the first power signal, said second wiring segment is connected only between said second and third nodes for carrying out half-duplex or full-duplex point-to-point digital data communication of second serial digital data and for simultaneously carrying a second power signal, said second node couples the second power signal to said second wiring segment, and said third node is operative to be at least in part powered by the second power signal, said third wiring segment is connected only between said second and fourth nodes for carrying out half-duplex or full-duplex point-to-point digital data communication of third serial digital data and for simultaneously carrying a third power signal, said second node couples the third power signal to said third wiring segment, and said fourth node is operative to be at least in part powered by the third power signal, and said second node is operative for passing therethrough:

at least part of the first serial digital data and the second serial digital data;

at least part of the first serial digital data and the third serial digital data, and at least part of the power from the first power signal to the second and third power signals.

57. The network according to claim 56, wherein at least one of said wiring segments comprises one of: a twisted-wire pair; a coaxial cable; telephone wiring; and powerline wiring.

58. The network according to claim 56, wherein at least one of said nodes is addressable in the network.

59. The network according to claim 58, wherein said at least one node has a manually assigned address.

60. The network according to claim 58, wherein said at least one node has an automatically assigned address.

61. The network according to claim 58, wherein said at least one node has an address assigned by a data unit connected to the node.

62. The network according to claim 56, wherein the first, second and third serial digital data are packet-based.

63. The network according to claim 56, wherein at least one of said nodes is wall mounted and at least one of said wiring segments is inside a wall.

64. The network according to claim 56, wherein at least one of said nodes is housed within an outlet.

65. The network according to claim 56, wherein the first, second and third power signals are direct current (DC) power signals.

66. The network according to claim 56, wherein at least one of said third and fourth nodes is operative to power a device connected thereto.

67. The network according to claim 66, further operative for connecting and disconnecting power from a connected device in response to a data element of serial digital data carried over one of said wiring segments connected to said one of said third and fourth nodes.

68. The network according to claim 66, further operative for measuring the power supplied to the connected device and transmitting data representing the measured power as part of the serial digital data carried over a wiring segment connected to said one of said third and fourth nodes.

69. The network according to claim 56, wherein one of said nodes is connectable to a sensor, a distinct other one of said nodes is connectable to an actuator, and the actuator operates in response to the sensor output.

70. The network according to claim 56, wherein at least one of said wiring segments is at least in part in a wall of a house and is connected to a respective one of said nodes via at least one outlet.

71. The network according to claim 56, wherein all of said wiring segments carries the respective power signals over dedicated conductors.

72. The network according to claim 56, wherein at least one of said wiring segments carries a respective power signal and digital data over the same wires.

73. The network according to claim 72, wherein said at least one of said wiring segments carries the respective power signal and digital data using frequency division multiplexing, wherein the power signal is carried over a frequency band distinct from the frequency band carrying the digital data.

74. The network according to claim 56, wherein at least one of said wiring segments comprises a twisted-wire pair, and the power signal is a DC power signal.

75. The network according to claim 56, wherein at least one of said wiring segments is AC power wiring, and the power signal is an AC power signal.

76. The network according to claim 56, wherein at least one of said nodes further comprises a visual indicator for indicating a communication status.

77. The network according to claim 56, wherein the same protocol is used for the data carried over said first, second and third wiring segments.

78. The network according to claim 56, wherein information carried by at least one out of the first, second and third serial digital data is used to control at least one of the first, second and third power signals.

79. The network according to claim 78, wherein the control is one of: on/off operation; timing of operations; and delayed start.

80. The network according to claim 78, wherein at least one of the first, second and third serial digital data signals is used to monitor or sense the power consumption from at least one out of said first, second and third power signals.

81. The network according to claim 56, wherein at least one of the first, second and third power signals is current limited.

82. A device for configuring a network for communication and power coupling communication data and power between a first wiring segment and second and third wiring segments, for use with first, second and third point-to-point wiring segments in a building each having two ends, each wiring segment having at least two conductors and simultaneously carrying serial digital data and power signals, said device comprising:
a first connector for connecting to one end of the first wiring segment that simultaneously carries a first serial bi-directional digital data signal and a first power signal;
a first transceiver coupled to said first connector for conducting point to point communication over the first wiring segment with a mating transceiver connected to the other end; a second connector for connecting to the second wiring segment that simultaneously carries a second serial bi-directional digital data signal and a second power signal;
a second transceiver coupled to said second connector for conducting point to point communication over the second wiring segment, wherein said second transceiver is coupled to said first transceiver for passing at least part of the first data between said first and second transceivers, and said second connector is coupled to said first connector for forming the second power signal from power contained in the first power signal;
a third connector for connecting to the third wiring segment that simultaneously carries a third serial bi-directional digital data signal and a third power signal;
a third transceiver coupled to said third connector for conducting point to point communication over the third wiring segment, wherein said third transceiver is coupled to said first transceiver for passing at least part of the first data between said first and third transceivers, wherein said third connector is coupled to said first connector for forming the third power signal from power contained in the first power signal; and
a single enclosure housing said first, second and third connectors and said first, second and third transceivers.

83. The device according to claim 82, wherein said first, second and third transceivers are operative for full duplex, packet-based communication over respectively connected wiring segments.

84. The device according to claim 82, wherein at least one of the wiring segments comprises one of: a twisted-wire pair; a coaxial cable; telephone wiring; and powerline wiring, and one of said transceivers connected to the at least one wiring segment is operative to conduct digital data over the at least one wiring segment.

85. The device according to claim 82, wherein said device is addressable in the network.

86. The device according to claim 85, wherein said device has a manually assigned address.

87. The device according to claim 85, wherein said device has an automatically assigned address.

88. The device according to claim 85, wherein said device has an address that is assigned by a data unit connected to said device.

89. The device according to claim 82, wherein said device is wall mounted and at least one of the wiring segments is inside a wall in a building.

90. The device according to claim 82, wherein said device is housed within an outlet.

91. The device according to claim 82, wherein the power signals carried in all of the wiring segments are DC power signals.

92. The device according to claim 82, wherein at least one of the wiring segments is at least in part in a wall of a building, and said device is constructed to be connectable to an outlet.

93. The device according to claim 82, wherein at least one of the wiring segments carries the respective power signal over dedicated conductors.

94. The device according to claim 82, wherein at least one of the wiring segments carries the respective digital data and power signals over the same wires.

95. The device according to claim 94, wherein the at least one wiring segment carries the respective digital data and power signals using frequency division multiplexing, wherein the power signal is carried over a frequency band distinct from the frequency band carrying the digital data signal.

96. The device according to claim 82, wherein at least one of the wiring segments is a twisted-wire pair, and the power signal carried by the at least one wiring segment is a DC power signal.

97. The device according to claim 82, wherein at least one of said wiring segment is AC power wiring, and said power signal is a AC power signal.

98. The device according to claim 82, further comprising a visual indicator for indicating a communication status.

99. The device according to claim 82, wherein all of the digital data signals are formatted according to the same protocol.

100. The device according to claim 82 further being wall-mountable.

101. The device according to claim 82 further comprising:
a data/power splitter for separating data and power signals carried over the same conductors and having first, second and third ports, said data/power splitter being operative to bi-directionally pass a digital data signal between said first and second ports, and to pass a DC power signal from said first port to said third port,
wherein said first port of said data/power splitter is coupled to said first connector, said second port of said data/power splitter is coupled to said first transceiver, and said third port of said data/power splitter is coupled to said second and third connectors.

102. The device according to claim 101 wherein said data/power splitter comprises a center-tapped transformer.

103. The device according to claim 101 wherein said data/power splitter comprises a low pass filter coupled between said first and third ports, and a high pass filter coupled between said first and second ports.

104. The device according to claim 82 further comprising:
a data/power combiner for combining data and power signals to be carried over the same conductors and having first, second and third ports, said data/power combiner being operative to bi-directionally pass a digital data signal between said first and second ports, and to pass a DC power signal from said third port to said first port,
wherein said first port of said data/power splitter is coupled to said second connector, said second port of said data/power splitter is coupled to said second transceiver, and said third port of said data/power splitter is coupled to said first connector.

105. The device according to claim 104 wherein said data/power splitter comprises a center-tapped transformer.

106. The device according to claim 104 wherein said data/power splitter comprises a low pass filter coupled between said first and third ports, and a high pass filter coupled between said first and second ports.

107. The device according to claim 82, wherein information carried in at least one out of the first, second and third serial digital data signals is used to control at least one of the first, second and third power signals.

108. The device according to claim 107, wherein the control is one of: an on/off operation, timing of operations; and delayed start.

109. The device according to claim 107, wherein the at least one of the data signals is used to monitor the power consumption of at least one of second and third power signals.

110. The device according to claim 82 further comprising a current limiter for limiting the current of at least one of the first, second and third power signals.

111. A device for coupling to a DC power signal and a packet-based full-duplex serial digital data signal simultaneously carried over an Ethernet-based local area network (LAN) wiring comprising at least one twisted-wire pair, said device comprising:
a LAN wiring connector for connecting to the wiring;
a power/data splitter having first, second and third ports, wherein only the DC power signal is passed from said first port to said second port, and only the digital data signal is passed between said first and third ports, and wherein said power/data splitter comprises at least one center tap transformer, and wherein said first port is coupled to said LAN wiring connector;
a LAN transceiver coupled to said third port of said power/data splitter for point-to-point communication of the packet-based full duplex serial digital data with a transceiver of the same type as said LAN transceiver over said LAN wiring;
a power supply for DC voltage converting coupled to and powered from said second port of said power/data splitter, said power supply having a power source port;
a diode bridge coupled between said LAN wiring connector and said power supply for ensuring proper voltage polarity feeding to said power supply in case of wires swapping, wherein said LAN transceiver is connected to said power source port for being powered from said power supply;
a data port coupled to said LAN transceiver and connectable to a data unit for coupling the packet-based full-duplex serial digital data signal to the data unit; and
a visual indicator powered by said power supply for indicating the device status,
wherein the device is addressable in the LAN.

112. The device according to claim 111, wherein said device has a manually assigned address.

113. The device according to claim 111, wherein said device has an automatically assigned address.

114. The device according to claim 111, wherein said device has an address assigned by the data unit.

115. The device according to claim 111 further operative for coupling to a computer plug-in device, wherein said device further comprises a standard computer bus slot coupled to said data port and coupled to power the computer plug-in device from said power supply.

116. The device according to claim 111 in combination with a single enclosure housing said device, said single enclosure being structured to at least in part substitute for an existing outlet or to be pluggable into an outlet.

117. The device according to claim 111, wherein said power/data splitter consists of only passive components.

118. The device according to claim 111 wherein: the data unit is a wired digital data unit; said data port comprises a digital data connector connectable to the wired digital data unit; and said device further comprises a further transceiver coupled between said LAN transceiver and said digital data connector for bi-directional digital data communication with said wired digital data unit.

119. The device according to claim 118 wherein the communication with said wired digital data unit is full duplex and based on a standard parallel interface.

120. The device according to claim 118 wherein the communication with said wired digital data unit is full duplex standard serial communication.

121. The device according to claim 120, wherein said data unit has an Ethernet based interface.

122. The device according to claim 111 further comprising firmware and a processor executing said firmware, and wherein said processor is coupled to said LAN transceiver for controlling said LAN transceiver.

123. The device according to claim 111 further operative to power the data unit, wherein said data port is coupled to said power supply for powering the connected data unit therefrom.

124. The device according to claim 111 further operative for sensing a physical phenomenon, wherein said data unit is an analog sensor for sensing a physical phenomenon, and wherein said device further comprises an analog to digital converter coupled between said data port and said LAN transceiver for converting analog signals to digital signals.

125. The device according to claims 124, wherein the digital data signal contains digitized audio or video data, and said sensor is an audio or video device.

126. The device according to claim 111 further operative for producing a physical phenomenon, wherein said data unit is an analog actuator for producing the physical phenomenon, and wherein said device further comprises a digital to analog converter coupled between said data port and said LAN transceiver for converting digital signals to analog signals.

127. The device according to claims 126, wherein the digital data signal contains digitized audio or video data, and said actuator is an audio or video device.

128. The device according to claim 111 further operative for telephony use wherein: the packet-based full-duplex serial digital data comprises digitized telephony data; the data unit is a telephony apparatus said device further comprises connected to constitute a termination of a telephone link; and a converter coupled between said LAN transceiver and said data port for coupling the digitized telephony data to the telephony apparatus.

129. The device according to claim 128 wherein the telephony apparatus is an analog telephone set, and wherein said data port comprises a standard analog telephone connector.

130. The device according to claim 128 in combination with an enclosure enclosing said device and the telephony apparatus enclosure.

131. The device according to claim 111 further enclosed with the data unit coupled to said device.

132. A device for coupling to a cable that simultaneously carries a DC power signal over two dedicated conductors and a half-duplex serial digital data signal over at least one twisted-wire pair, said device comprising:
    a wiring connector for connecting to the cable;
    a transceiver coupled to said wiring connector for being powered from the DC power signal and for point-to-point communication of the half duplex serial digital data with a transceiver of the same type as said LAN transceiver over said cable;
    a data port coupled to said transceiver and couplable to a data unit for coupling the half-duplex serial digital data signal to the data unit; and
    a visual indicator coupled to said wiring connector to be powered by the power signal for indicating a status of said device,
wherein: said device is addressable; the data unit is a wired digital data unit; said data port comprises a digital data connector connectable to the wired digital data unit; and said device further comprises a further second transceiver coupled between said transceiver and said digital data connector for bi-directional digital data communication with said wired digital data unit.

133. The device according to claim 132, wherein said device has a manually assigned address.

134. The device according to claim 132, wherein said device has an automatically assigned address.

135. The device according to claim 132, wherein said device has an address assigned by said data unit.

136. The device according to claim 132 further operative for coupling to a computer plug-in device, wherein said device further comprises a standard computer bus slot coupled to said data port and coupled to power the computer plug-in device from said DC power signal.

137. The device according to claim 132 in combination with a single enclosure housing said device, said single enclosure being structured to at least in part substitute for an existing outlet or to be pluggable into an outlet.

138. The device according to claim 132 wherein the communication with said wired digital data unit is full duplex and based on a standard parallel interface.

139. The device according to claim 132 wherein the communication with said wired digital data unit is full duplex standard serial communication.

140. The device according to claim 139, wherein said data unit has an Ethernet based interface.

141. The device according to claim 132 further operative to power the data unit, wherein said data port is coupled to said power supply for powering the connected data unit therefrom.

142. A device for coupling to a cable that simultaneously carries a DC power signal over two dedicated conductors and a half-duplex serial digital data signal over at least one twisted-wire pair, said device comprising:
    a wiring connector for connecting to the cable;
    a transceiver coupled to said wiring connector for being powered from the DC power signal and for point-to-point communication of the half duplex serial digital data with a transceiver of same type as said LAN transceiver over said cable;
    a data port coupled to said transceiver and couplable to a data unit for coupling the half-duplex serial digital data signal to the data unit; and
    a visual indicator coupled to said wiring connector to be powered by the power signal for indicating a status of said device,
    wherein: said device is addressable; and said device further comprises firmware and a processor executing said firmware, and wherein said processor is coupled to said transceiver for controlling said transceiver.

143. A device for coupling to a cable that simultaneously carries a DC power signal over two dedicated conductors and a half-duplex serial digital data signal over at least one twisted-wire pair, said device comprising:
    a wiring connector for connecting to the cable;
    a transceiver coupled to said wiring connector for being powered from the DC power signal and for point-to-point communication of the half duplex serial digital data with a transceiver of the same type as said LAN transceiver over said cable;
    a data port coupled to said transceiver and couplable to a data unit for coupling the half-duplex serial digital data signal to the data unit; and
    a visual indicator coupled to said wiring connector to be powered by the power signal for indicating a status of said device,
    wherein: said device is addressable; said device is further operative for sensing a physical phenomenon; said data unit is an analog sensor for sensing a physical phenomenon; and said device further comprises an analog to digital converter coupled between said data port and said transceiver for converting analog signals to digital signals.

144. The device according to claims 143, wherein the digital data signal contains digitized audio or video data, and said sensor is an audio or video device.

145. A device for coupling to a cable that simultaneously carries a DC power signal over two dedicated conductors and a half-duplex serial digital data signal over at least one twisted-wire pair, said device comprising:
  a wiring connector for connecting to the cable;
  a transceiver coupled to said wiring connector for being powered from the DC power signal and for point-to-point communication of the half duplex serial digital data with a transceiver of the same type as said LAN transceiver over said cable;
  a data port coupled to said transceiver and couplable to a data unit for coupling the half-duplex serial digital data signal to the data unit; and
  a visual indicator coupled to said wiring connector to be powered by the power signal for indicating a status of said device,
  wherein: said device is addressable; said device is further operative for producing a physical phenomenon; said data unit is an analog actuator for producing the physical phenomenon; and said device further comprises a digital to analog converter coupled between said data port and said transceiver for converting digital signals to analog signals.

146. The device according to claims 145, wherein the digital data signal contains digitized audio or video data, and said actuator is an audio or video device.

147. A device for coupling to a cable that simultaneously carries a DC power signal over two dedicated conductors and a half-duplex serial digital data signal over at least one twisted-wire pair, said device comprising:
  a wiring connector for connecting to the cable;
  a transceiver coupled to said wiring connector for being powered from the DC power signal and for point-to-point communication of the half duplex serial digital data with a transceiver of the same type as said LAN transceiver over said cable;
  a data port coupled to said transceiver and couplable to a data unit for coupling the half-duplex serial digital data signal to the data unit; and
  a visual indicator coupled to said wiring connector to be powered by the power signal for indicating a status of said device,
  wherein: said device is addressable; said device is further operative for telephony use; the packet-based full-duplex serial digital data signal comprises digitized telephony data; the data unit is a telephony apparatus connected to constitute a termination of a telephone link; and said device further comprises a converter coupled between said transceiver and said data port for coupling the digitized telephony data to the telephony apparatus.

148. The device according to claim 147 wherein the telephony apparatus is an analog telephone set, and wherein said data port comprises a standard analog telephone connector.

149. The device according to claim 147 in combination with an enclosure enclosing said device and the telephony apparatus.

* * * * *